US007039861B2

(12) United States Patent
Yagi

(10) Patent No.: US 7,039,861 B2
(45) Date of Patent: May 2, 2006

(54) PRESENTATION DATA-GENERATING DEVICE, PRESENTATION DATA-GENERATING SYSTEM, DATA-MANAGEMENT DEVICE, PRESENTATION DATA-GENERATING METHOD AND MACHINE-READABLE STORAGE MEDIUM

(75) Inventor: Atsuko Yagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 399 days.

(21) Appl. No.: 10/395,205

(22) Filed: Mar. 25, 2003

(65) Prior Publication Data

US 2003/0221170 A1 Nov. 27, 2003

(30) Foreign Application Priority Data

Mar. 29, 2002 (JP) ............................ 2002-098051
Mar. 18, 2003 (JP) ............................ 2003-074118

(51) Int. Cl.
*G06F 15/00* (2006.01)

(52) U.S. Cl. ...................... 715/517; 715/523; 715/526

(58) Field of Classification Search ................ 715/500, 715/513, 517, 523, 526, 760, 530
See application file for complete search history.

(56) References Cited

U.S. PATENT DOCUMENTS 6,023,714 A * 2/2000 Hill et al. ................... 715/513
6,564,260 B1 * 5/2003 Baber et al. ................ 709/223
6,822,663 B1 * 11/2004 Wang et al. ................ 715/854
2001/0011287 A1 * 8/2001 Goto et al. ................. 707/513
2001/0047397 A1 11/2001 Jameson ..................... 209/217
2001/0056460 A1 12/2001 Sahota et al. ............... 715/513
2002/0078101 A1 * 6/2002 Chang et al. ............... 707/523
2002/0111963 A1 * 8/2002 Gebert et al. ............... 707/513
2003/0037076 A1 * 2/2003 Bravery et al. ............. 707/517
2003/0078934 A1 * 4/2003 Cappellucci et al. ....... 707/101
2003/0182450 A1 * 9/2003 Ong et al. .................. 709/246
2004/0163046 A1 * 8/2004 Chu et al. ................... 715/517

OTHER PUBLICATIONS

Spyglass, "Displays Existing Web Content up to Four Times Faster on Non-PC Devices", copyright 1997, pp. 1-2.*
Spyglass, "Spyglass Prism Content Conversion Solution Debuted at Embedded Systems East '97", Mar. 1997, pp. 3.*
T. Bickmore et al., "Digestor: device-independent access to the World Wide Web", Computer Networks and ISDN Systems, 1997, pp. 1-8.*
U.S. Appl. No. 10/395,205, filed Mar. 25, 2003, Yagi.
U.S. Appl. No. 10/666,249, filed Sep. 22, 2003, Yagi.

* cited by examiner

*Primary Examiner*—William Bashore
*Assistant Examiner*—Maikhanh Nguyen
(74) *Attorney, Agent, or Firm*—Oblon, Spivak, McClelland, Maier & Neustadt, P.C.

(57) ABSTRACT

A presentation data-generating device includes a first part for acquiring document data sets, each containing contents to be presented, a second part for acquiring transformation data sets, each defining a transformation rule between the document data sets and a presentation data set, and, a third part for acquiring layout data containing layout information that defines a layout of the document data sets. The device further includes a fourth part for transforming the document data sets based on the layout data and the transformation data sets to generate a unified presentation data set that presents contents of the document data sets based on the layout defined in the layout data.

31 Claims, 17 Drawing Sheets

```
        <?xml version="1.0" encoding="Shift_JIS"?>
        - <profiles user="taro">  ~ 5011
          - <informations>
     /      - <user>
    |           <firstName>Taro</firstName>
    |           <familyName>Yamada</familyName>
5012 <          <organization>RRR</organization>
    |         </user>
     \     </informations>
          - <webExplorer version="2.0">
     /   - <context name="InternetExplorer">
    |        - <zones>
    |          - <top>
    |              <unit type="public" uri="search.xml"/>  ~ 5013a
    |            </top>
    |          - <left>
    |              <unit type="user" uri="services.xml"/>  ~ 5013b
    |            </left>
5013 <         - <center>
    |              <unit type="user" uri="ListTest.xml"/>
    |            </center>
    |            <right/>
    |          - <bottom>  ~ 5013c
    |              <unit type="public" uri="bookmark.xml"/>
    |            </bottom>
    |          </zones>
     \     </context>
     /   - <context name="pocketIE">
    |     - <zones>
    |      - <top>
    |         <unit type="public" uri="search.xml"/>
    |        </top>
    |        <left/>
    |      - <center>
5014 <        <unit type="user" uri="services.xml"/>
    |        </center>
    |        <right/>
    |        <bottom/>
    |       </zones>
    |      </context>
     \   </webExplorer>
        </profiles>
```

FIG.6

```
<?xml version="1.0" encoding="Shift_JIS"?>
 <unit>
  <value>
  <serviceList>
   <service
    uri="http://133.139.8.125/rdh/servlet/RepositoryService">SSC</service>
   </serviceList>
  </value>
  <template>ServiceList.unit.xsl</template>
 </unit>
```

FIG.7

```
<?xml version="1.0" encoding="Shift_JIS"?>
 <unit>
  <class>jp.co.rrr.fmix.pci.we.unit.FolderAndDocumentListUnit</class>
  <parameters>
   <parameter name="ServiceURI">
    http://133.139.8.123:10000/rdh/servlet/RepositoryService</parameter>
   <parameter name="Folder0IID"/>
   <parameter name="DocumentType0IID">1</parameter>
   <parameter name="SortKey">1</parameter>
   <parameter name="RangeBegin">0</parameter>
   <parameter name="RangeCount">10</parameter>
  </parameters>
  <template>FolderAndDocumentList.unit.xsl</template>
 </unit>
```

FIG.8

```
<?xml version="1.0" encoding="Shift_JIS"?>
<?xml-stylesheet type="text/xsl" href="bookmark.xsl"?>
<my_bookmark>
      <unit_title>
            MY BOOKMARK
      </unit_title>
      <contents>
            <item>
                  <url>http://www.rrr.co.jp/</url>
                  <site_name>RICOH</site_name>
            </item>
            <item>                                          } 5041
                  <url>http://www.yyy.co.jp/</url>
                  <site_name>Yahoo</site_name>
            </item>
      </contents>
</my_bookmark>
```

FIG.9

```
  <?xml version="1.0" encoding="Shift_JIS"?>
- <page>
  - <contents>
      <!-- ADD CONTENTS OF UNITS HERE-->  ~5042
    </contents>
  </page>
 <?xml-stylesheet type="text/xsl" href="list.xsl"?>
```

FIG.10

```
 <?xml version="1.0" encoding="UTF-8"?>
- <xsl:stylesheet version="1.0"
    xmlns:xsl="http://www.w3.org/1999/XSL/Transform">
    <xsl:include href="FolderAndDocumentList.zone.xsl" /> ~5031
  - <xsl:template match="zone/reportList">
    - <p class="zoneunit_title">
      - <table class="folderanddocumentlist_unit_title">
          <xsl:text>□ Document and Folder View </xsl:text>
        </table>
      </p>
    <xsl:apply-templates select="ItemList"/>
  </xsl:template>
- <xsl:template match="reportList/ItemList/List/FolderInfo/Name">
    <xsl:value-of select="."/>
  </xsl:template>
- <xsl:template match="reportList/ItemList/List/DocumentInfo/Name">
    <xsl:value-of select="."/>
  </xsl:template>
 </xsl:stylesheet>
```

FIG.11

```
 <?xml version="1.0" encoding="UTF-8"?>
- <xsl:stylesheet version="1.0"
    xmlns:xsl="http://www.w3.org/1999/XSL/Transform">
   <xsl:include href="CurrentViewInfo.xsl"/> ~5032

- <xsl:element name="a">
  - <xsl:attribute name="href">

          <xsl:text>./jp.co.ricoh.fmix.pci.we.servlet.FolderAndDocumentList?
           ServiceURI=</xsl:text>
      <xsl:value-of select="CurrentInfo/DMInfo/Server/@URI" />
   - <xsl:if test="not(CurrentInfo/DMInfo/Folder/@OIID = '')">
          <xsl:text>&FolderID=</xsl:text>
          <xsl:value-of select="CurrentInfo/DMInfo/Folder/@OIID" />
      </xsl:if>
   - <xsl:if test="not(CurrentInfo/DMInfo/DocumentType/@OIID = '')">
          <xsl:text>&DocTypeID=</xsl:text>
          <xsl:value-of select="CurrentInfo/DMInfo/DocumentType/@OIID" />
      </xsl:if>
   - <xsl:if test="not(CurrentInfo/ListInfo/SortKey/@ID = '')">
          <xsl:text>&SortKey=</xsl:text>
          <xsl:value-of select="CurrentInfo/ListInfo/SortKey/@ID" />
      </xsl:if>
   - <xsl:if test="not(CurrentInfo/ListInfo/Content/@Begin = '')">
          <xsl:text>&Index=</xsl:text>
          <xsl:value-of select="CurrentInfo/ListInfo/Content/@Begin" />
      </xsl:if>
   - <xsl:if test="not(CurrentInfo/ListInfo/Content/@Required = '')">
          <xsl:text>&Items=</xsl:text>
          <xsl:value-of select="CurrentInfo/ListInfo/Content/@Required" />
     </xsl:if>
   </xsl:attribute>
   <xsl:text>Go to Document List View</xsl:text>
 </xsl:element>
</xsl:template>
</xsl:stylesheet>
```

FIG.12

```
<?xml version="1.0" encoding="Shift_JIS"?>
- <xsl:stylesheet xmlns:xsl="http://www.w3.org/TR/WD-xsl" xml:lang="ja">
  - <xsl:template match="/">
    - <html lang="ja">
      - <head>
        - <title>
            <xsl:value-of select="my_bookmark/unit_title" />~5051
          </title>
        </head>
- <body>
  - <div>
          <xsl:value-of select="my_bookmark/unit_title" />                          } 5052
          <xsl:apply-templates select="my_bookmark/contents/item" />            }
    </div>
  </body>
</html>
</xsl:template>

- <xsl:template match="my_bookmark/contents/item">          }
  - <div>                                                      }
      .                                                        }
                                                               }
    - <a>                                                      }
      - <xsl:attribute name="href">                            } 5053
          <xsl:value-of select="url" />                        }
        </xsl:attribute>                                       }
        <xsl:value-of select="site_name" />                    }
      </a>                                                     }
    </div>                                                     }
</xsl:template>                                                }
</xsl:stylesheet>
```

FIG.13

```
<?xml version="1.0" encoding="Shift_JIS"?>
- <xsl:stylesheet version="1.0"
    xmlns:xsl="http://www.w3.org/1999/XSL/Transform">
   <!-- ADD XSL OF UNITS TO BE IMPORTED HERE-->
 - <xsl:template match="/">
   - <html lang="ja">
     - <head>
       - <title>
           <xsl:call-template name="header_title"/>
         </title>
       </head>
     - <body>
           <xsl:apply-templates select="page/contents"/>
       </body>
     </html>
   </xsl:template>
   <!-- MODIFY THE FOLLOWING SCRIPTS IN ACCORDANCE
        WITH UNIT INFORMATION TO BE ADDED--> ~5054
- <xsl:template match="contents/zone">
     <xsl:apply-templates/>
   </xsl:template>
 </xsl:stylesheet>
```

HIERARCHICAL STRUCTURE OF TRANSFORMATION DATA

HIERARCHICAL STRUCTURE OF DOCUMENT DATA

PRESENTATION DATA-GENERATING DEVICE, PRESENTATION DATA-GENERATING SYSTEM, DATA-MANAGEMENT DEVICE, PRESENTATION DATA-GENERATING METHOD AND MACHINE-READABLE STORAGE MEDIUM

BACKGROUND OF THE INVENTION

1. Field of the Invention

The present invention generally relates to a presentation data-generating device, and particularly relates to a presentation data-generating device in which document data to be presented is transformed into presentation data based on transformation data.

The present invention also relates to a method, system, data management device and a machine-readable medium for generating presentation data.

The document data to be presented may be in a format such as extensible markup language (XML), the transformation data may be in a format such as extensible style sheet language (XSL), and, the presentation data may be in a format such as hypertext markup language (HTML).

2. Description of the Related Art

Standard markup language (SGML) standardized by the International Standardization Organization (ISO) is one of the data description languages known in the art. Recently and continuing, extensible markup language (XML) use is becoming greater. XML is a data description language that has been developed based on SGML such that data exchange over the Internet is taken into consideration.

XML makes use of various tags to describe attributes and structures of contained data elements. Further, types and names of the tags can be freely configured if required. Therefore, XML allows describing an extremely wide variety of data. Also, since data is described in a text format, data can be exchanged in a platform-independent manner.

However, generally, information described in XML (hereinafter referred to as "XML data"; similarly, information described in XSL will be referred to as an "XSL data" and information described in HTML will be referred to as an "HTML data") does not contain style information and therefore, without any transformation, the XML data cannot be presented in a preferred style. Moreover, some of the widely used browsers for presenting information on the Internet are not capable of interpreting the structure of XML data.

Therefore, when XML data is to be presented on a browser, the XML data is transformed in to HTML data that can be understood by the browser. An extensible style sheet language (XSL) is known as a language used for describing data that defines rules for such a transformation.

Thus by transforming the XML data to be presented on a browser into the HTML data by means of an XSL processor and in accordance with the rules defined by the XSL data, the browser can interpret the contents of the data and present the data. Upon transformation, the XML data may be transformed into HTML data having an appropriate data format so as to present the contents of the XML data in a desired format.

However, according to the method of the related art, a single XML data set is transformed into a single HTML data set in accordance with a single XSL data set. Therefore, with such a method of the related art, it is difficult to transform contents of a plurality of HTML data sets into a single HTML data set and present it on the browser.

SUMMARY OF THE INVENTION

Accordingly, it is a general object of the present invention to provide a presentation data-generating device that can obviate the problems described above.

It is another and more specific object of the present invention to provide a presentation data-generating device in which a plurality of document data sets is transformed into a presentation data set by referring to a predetermined plurality of transformation data sets such that, in a presentation operation based on the presentation data set, a process of presenting the contents of a plurality of document data sets in accordance with a single presentation data set can be performed in a facilitated manner.

It is still another object of the present invention to provide a presentation data-generating device that can present contents of a plurality of document data sets with a desired layout.

In order to achieve the above objects according to the present invention, a device for generating presentation data includes a document data acquisition part for acquiring a plurality of document data sets, each document data set containing contents to be presented, a transformation data acquisition part for acquiring a plurality of transformation data sets, each transformation data set defining a rule for transforming respective one of the document data sets into a presentation data set that presents contents of the document data sets, and, a layout data acquisition part for acquiring a layout data set containing layout information that defines a layout of the document data sets upon presenting contents of the document data sets. The device further includes a presentation data-generating part for transforming the document data sets based on the layout data set and on the transformation data sets so as to generate a unified presentation data set that presents contents of the document data sets in accordance with the layout defined in the layout data set.

In order to achieve the above objects according to the present invention, a system for generating presentation data includes a presentation data generating-device and a data management device connected to the presentation data generating-device. In the system, the presentation data generating-device includes a document data acquisition part for acquiring a plurality of document data sets, each document data set containing contents to be presented, a transformation data acquisition part for acquiring a plurality of transformation data sets, each transformation data set defining a rule for transforming respective one of the document data sets into a presentation data set that presents contents of the document data sets, a layout data acquisition part for acquiring a layout data set containing layout information that defines a layout of the document data set upon presenting contents of the document data set, and, a presentation data-generating part for transforming the document data sets based on the layout data set and on the transformation data sets so as to generate a unified presentation data set that presents contents of the document data sets in accordance with the layout defined in the layout data set. The data management device includes a data storage part for storing the document data sets and the transformation data sets corresponding to the document data sets. In the presentation data generating-device, the document data acquisition part includes a part for acquiring the document data sets from the data management device, and, the transformation data acquisition part includes a part for acquiring the transformation data sets from the data management device.

In order to achieve the above objects according to the present invention, a system for generating presentation data a system includes the presentation data-generating device described above and an identification information acquiring-device connected to the presentation data-generating device. The identification information acquiring-device may include an identification information-acquiring part for acquiring identification of a user sending a generation request of a presentation data set to the presentation data-generating device. The layout data acquisition part of the presentation data generating-device acquires a layout data set for the user in accordance with the identification data. Alternatively, the identification information acquiring-device may include an identification information-acquiring part for acquiring identification of a client sending a generation request of a presentation data set to the presentation data-generating device. The layout data acquisition part of the presentation data generating-device acquires a layout data set for the client in accordance with the identification data. Alternatively, the identification information acquiring-device may include a device type acquisition part for acquiring device type information of a device on which the presentation data set is to be presented. The layout data acquisition part acquires the layout data set indicating a layout suitable for presentation on a type of device indicated by the device type information.

In order to achieve the above objects according to the present invention, a data management device is connected to the above-mentioned presentation data generating-device via a network. The data management device includes a data storage part for storing the document data sets, and, a data transmission part for acquiring the document data sets from the storage part in accordance with the request from the presentation data generating-data and transmitting the document data sets to the presentation data storage device.

In order to achieve the above objects according to the present invention, a method for generating presentation data includes the steps of acquiring a layout data set containing layout information that defines a layout of the document data set upon presenting contents of the document data sets, acquiring a plurality of document data sets, each document data set containing contents to be presented, and acquiring a plurality of transformation data sets, each transformation data set defining a rule for transforming respective one of the document data sets into a presentation data set that presents contents of the document data sets. The method further includes a step of transforming the document data sets based on the layout data set and on the transformation data sets so as to generate a unified presentation data set that presents contents of the document data sets in accordance with the layout defined in the layout data set.

Further, in order to achieve the above objects according to the present invention, a machine-readable storage medium storing program code for causing a computer to generate presentation data, includes first program code means for acquiring a plurality of document data sets, each document data set containing contents to be presented, second program code means for acquiring a plurality of transformation data sets, each transformation data set defining a rule for transforming respective one of the document data sets into a presentation data set that presents contents of the document data sets, and, third program code means for acquiring a layout data set containing layout information that defines a layout of the document data sets upon presenting contents of the document data sets. The machine-readable storage medium further includes fourth program code means for transforming the document data sets based on the layout data set and on the transformation data sets so as to generate a unified presentation data set that presents contents of the document data sets in accordance with the layout defined in the layout data set.

In the presentation data-generating device, data-management device, system, method and machine-readable storage medium described above, it is possible to facilitate a process of presenting contents of a set of plurality of document data sets on a single page. Further, the contents of a plurality of document data sets can be presented in a desired layout.

BRIEF DESCRIPTION OF THE DRAWINGS

FIG. 5 shows an example of the layout data used for the presentation data-generating process;

FIG. 6 is a diagram showing an example of the content information shown in FIG. 3;

FIG. 7 is a diagram showing another example of the content information shown in FIG. 3;

FIG. 8 shows an example of document data;

FIG. 9 shows an example of a document data template;

FIG. 10 shows an example of element information;

FIG. 11 shows an example in which the transformation data corresponding to the parts are referred to in the element;

FIG. 12 shows an example of the transformation data corresponding to a block;

FIG. 13 shows an example of a transformation data template;

DETAILED DESCRIPTION OF THE PREFERRED EMBODIMENTS

In the following, principles and embodiments of the present invention will be described with reference to the accompanying drawings.

Figure 1:
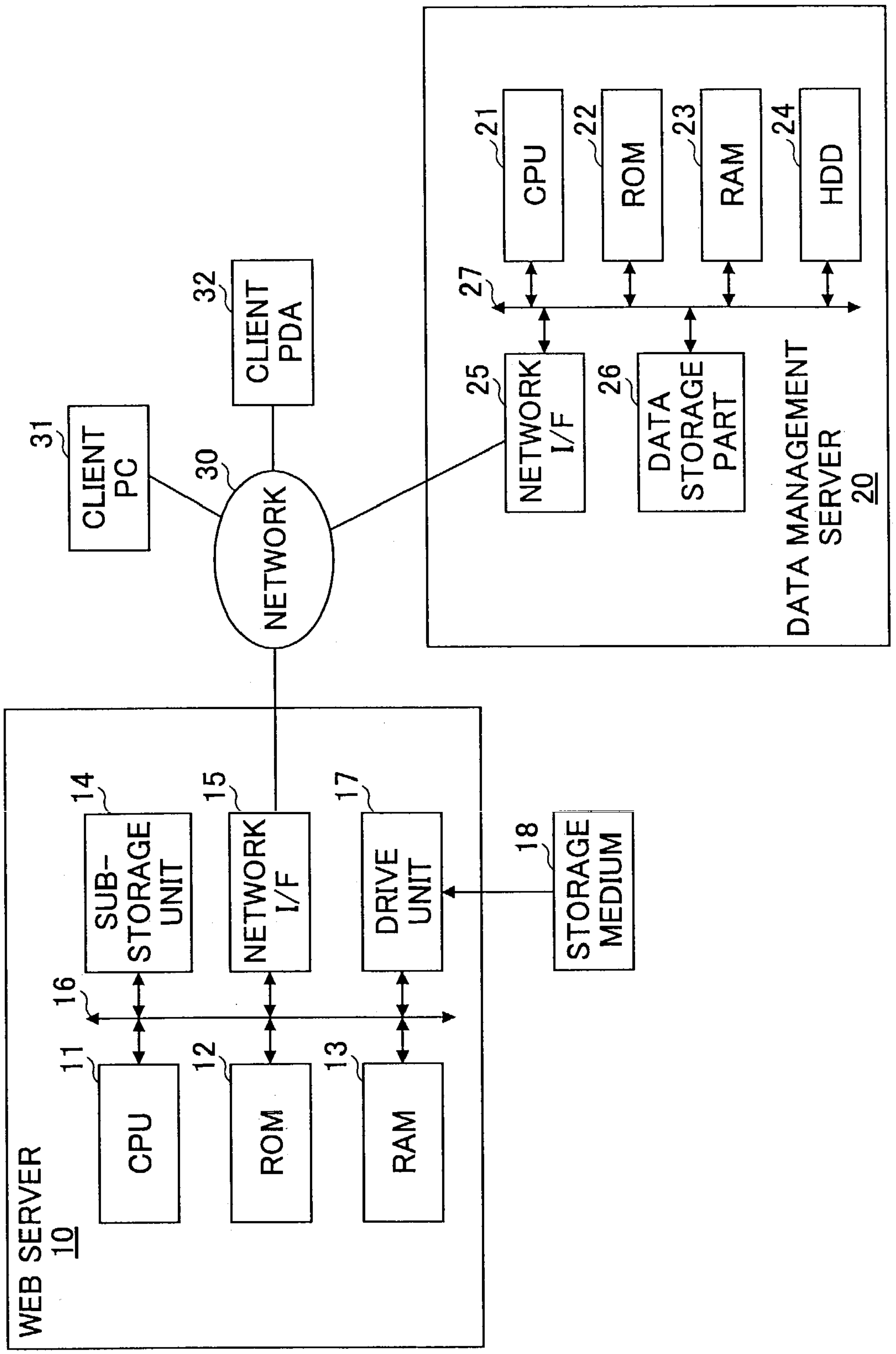
FIG. 1 is a block diagram showing a general configuration of a web service system of an embodiment of the presentation data-generating device of the present invention.

General configurations of a device and a system of an embodiment of the present invention will be described with reference to FIGS. 1 and 2. FIG. 1 is a block diagram showing a general configuration of a presentation data-generating system of the present invention. The presentation data-generating system generally includes a presentation data-generating device of the present invention and a data management server, which is a data management device of the presentation data-generating device. In the present embodiment, the presentation data-generating system is a web service system and the presentation data-generating device is a web server.

The web service system generally includes a web server 10 and a data management server 20 that are connected with each other via a network 30. In response to a representation request sent from client devices such as client personal computers (PC) 31 and client personal data assistants (PDA) 32 via the network 30, the web service system generates presentation data for presenting contents of document data and supplies the generated presentation data to the client devices. According to the characteristic aspect of the present invention, a single unified presentation data set for presenting contents of a plurality of document data sets with a desired layout can be generated.

The network 30 may be the Internet or may be any network provided in a particular organization such as an intra-network or a local area network (LAN), or may be a combination thereof. The network 30 may be a wired network or a wireless network.

The web server 10 may be of a hardware configuration using a known server device. That is to say, the web server 10 may generally include a CPU (Central Processing Unit) 11, a ROM (Read-Only Memory) 12, a RAM (Random Access Memory) 13, a hard disk drive (HDD) 14, a network interface (I/F) 15, and a drive unit 17, all of which being connected by a system bus 16.

The CPU 11 is a control part having an overall control over the web server 10. The CPU 11 executes various control programs and application programs stored in the ROM 12 and/or in the HDD 14 to perform various operations such as device control, communications control, data acquisition and data editing.

ROM 12 is a storage device capable of mainly storing control programs of the device and RAM 13 is a storage used as a work memory or for storing temporary data.

The HDD 14 is a storage part capable of storing various application programs and data. Not only the document data but also transformation data and layout data described below may be stored in the HDD 14, as required.

The network I/F 15 is an interface for connecting the web server 10 to the network 30.

The drive unit 17 is a unit for reading a storage medium 18 such as CD-ROMs in which programs for achieving various functions of the present inventions are stored.

There are no operation parts or presentation or display parts illustrated in FIG. 1. However, an operation part such as a keyboard or a mouse and a presentation part such as a liquid crystal display or a cathode ray tube may be provided to accept entry from the user or to present the result of an operation.

The data management server 20 may be of a hardware configuration using a known server device. That is to say, the data management server 20 may generally include a CPU (Central Processing Unit) 21, a ROM (Read-Only Memory) 22, a RAM (Random Access Memory) 23, a hard disk drive (HDD) 24 and a network interface (I/F) 25, each of which having a similar function as in the web server 10. The data management server 20 further includes a data storage part 26 that is a non-volatile memory for storing a large amount of document data and transformation data, all of which are connected by a system bus 27. The data storage part 26 may be provided such that the HDD 24 serves as the data storage part 26.

The client PC 31 and the client PDA 32 may be known PCs and PDAs, respectively. Each of the client PCs 31 and the client PDAs 32 may be provided with at least a communication function for communicating with other devices via the network 30 and a browser function for presenting or presenting contents of the document data based on the received presentation data.

One of the widely used schemes for describing contents to be presented by the browser is a scheme in which contents to be presented are described in an HTML format using Hypertext markup language (HTML). In accordance with the HTML format, the contents to be presented can be described together with their styles so that commonly used browsers can interpret the HTML data and present the contents of the document data in the specified style. Therefore, the presentation data to be used by the browser for presenting the contents of the document data is preferably HTML format data.

For describing document data to be presented, extensible markup language (XML) may be used since it gives a high degree of freedom in describing data. The transformation data that defines a rule for transforming the document data in XML format into HTML data for presenting contents of the document data on the browser is described using extensible style sheet language (XSL). In order to present the contents of the document data on the browser, the document data is transformed in accordance with the rule defined by the transformation data to generate presentation data in HTML format. The contents of the document data are presented in accordance with the thus-obtained presentation data.

It is to be noted that XSL format is one of the types of the XML format, and thus gives a high degree of freedom in describing the contents of the document data. Accordingly, when the transformation data is described in XSL or SML format, the transformation data can also be automatically generated and/or edited by a program similar to that of the document data and thus facilitate the designing of the transformation data. Further, HTML also has a common feature with the above-mentioned XML and XSL in that it is also a standard markup language (SGML) in a sense that it uses tags for giving meanings to documents.

When described in the XML format, the document data includes sentences (or data) and tags that encapsulate the sentences. "The contents to be presented" of the document data is to be understood as portions contained in the presentation data as a result of selections made in a transformation operation in accordance with the transformation data.

In the following description, XML format data, XSL format data and HTML format data are taken as examples of the document data, the transformation data and the presentation data, respectively, however, data formats applicable to the present invention are not limited to such formats.

Figure 2:
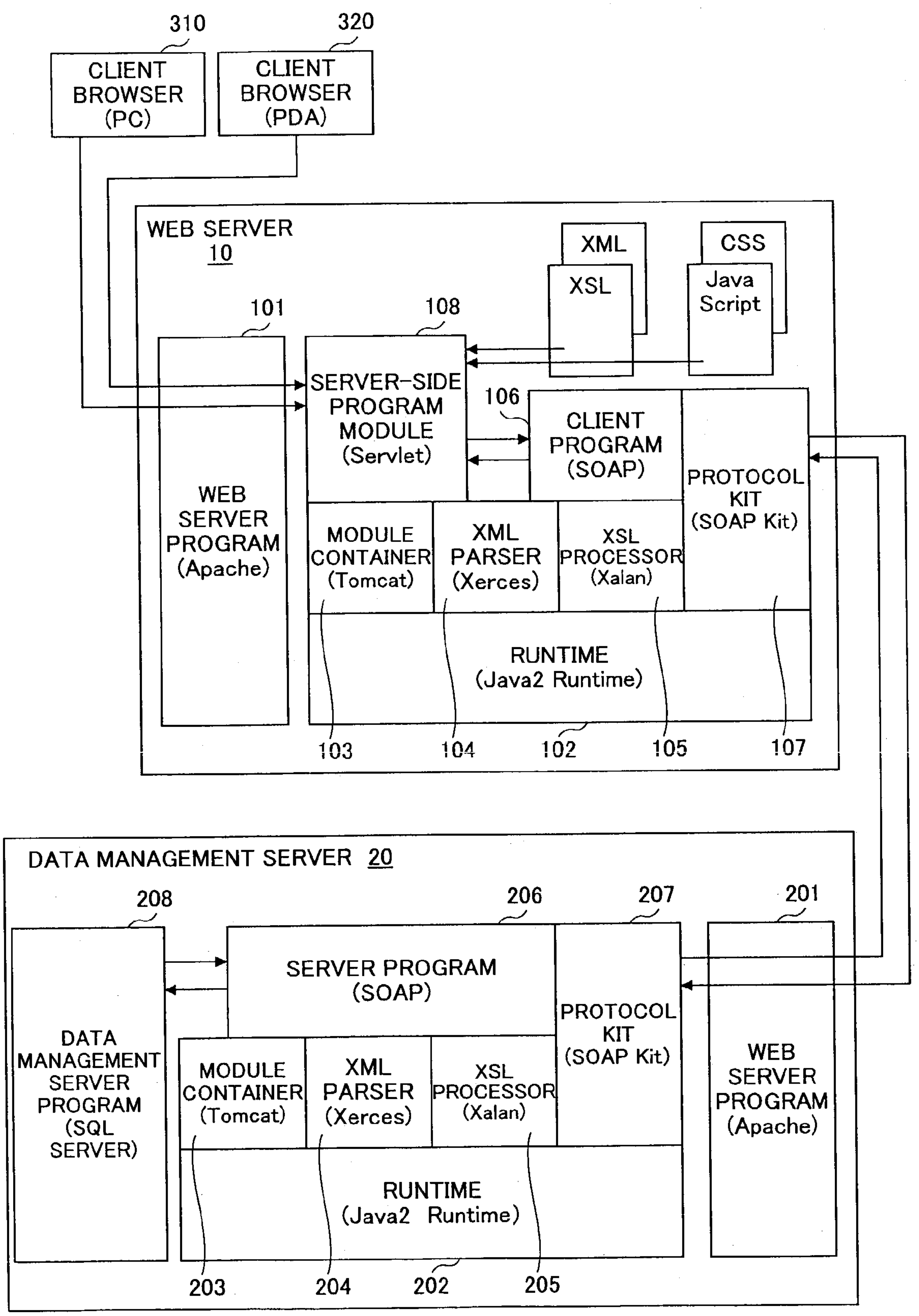
FIG. 2 is a schematic diagram showing the software configuration in the web service system of FIG. 1.

Referring now to FIG. 2, software configuration of the presentation data-generating system of the present invention will be described. FIG. 2 is a schematic diagram showing the software configuration of the web service system shown in FIG. 1.

As can be seen in FIG. 2, the web server 10 includes software such as a web server program 101, Runtime 102, a module container 103, an XML parser 104, an XSL processor 105, a client program 106, a protocol kit 107 and a server-side program module 108. The software programs are stored in the HDD 14 or in the ROM 12 such that the CPU 11 can read and execute them as required. The software may be acquired from any external source via the network I/F 15.

The web server program 101 is software used in a world wide web (WWW) system for transmitting files in response to requests sent from clients. Apache available from Apache Software Foundation may be used as the web server program 101.

Runtime 102 is a software module necessary for executing application software. In the present embodiment, Java2 Runtime for executing application software written in a program language called Java2 (Registered Trademark) available from Sun Microsystems is used.

The module container 103 is software providing an environment for executing the server-side program module 108. Tomcat, available from Apache Software Foundation, may be used as the module container 103.

The XML parser 104 is software for developing the XML data described in text into a tree-structure such that any other application can easily use the XML data. Xerces, available from Apache Software Foundation, may be used as the XML parser 104.

The XSL processer 105 is software for transforming the XML data in accordance with the XSL data. Xalan, available from Apache Software Foundation, may be used as the XSL processer 105.

The client program 106 is software used for requesting the transfer of files from other devices such as the data management server 20. A software program for performing communications using SOAP (Simple Object Access Protocol) may be used as the client program 106. The protocol kit 107 is software for actually performing communications in accordance with the request.

The server-side program module 108 is a modular program executed on the web server. Servlet created using Java2 may be used as the server-side program module 108. Most of the processes to be performed in the web server 10 that are essential to the present invention are achieved by causing the CPU 11 to function as various means in accordance with the server-side program module 108. In other words, the server-side program module 108 is a program that performs the steps of obtaining and referring to layout data which will be described later in response to a request sent from the client browser 310 and 320, obtaining a set of document data and/or a set of transformation data that is necessary for a desired presenting of the contents of the set of document data, and transforming the sets of document data to generate a single unified presentation data set for presenting the contents of the sets of document data at locations indicated in the layout data.

As in the case of the web server 10 of the present embodiment, when transforming the XML data into the HTML data in accordance with the XSL data, it is also possible to use cascading style sheet (SCC) data defining presentation modes that are not supported by HTML and XSL and Javascript (trademark) codes that define operations such as error pop-ups. The CSS data and JavaScript (trademark) codes may be directly described in the XSL data or may be contained in transformation data in the form of an XSL data by describing reference information pointing to these data and codes in the transformation data.

The data management server 20 includes software such as a web server program 201, Runtime 202, a module container 203, an XML parser 204, an XSL processor 205, a server program 206, a protocol kit 207 and a data management server program 208. The CPU 21 reads out and executes these software programs as required in a similar manner to the CPU 11 of the web server 10. Also, the functions of these software programs will not be described in detail, since the functions of the software, except for the server program 206 and the data management server program 208, are similar to those of software of the same names provided in the web server 10.

The server program 206 is software for transferring files in response to file transfer requests sent from other devices such as the web server 10. The server program 206 may also be software for performing communications, for example, using SOAP (Simple Object. Access Protocol). When software adapted to both a client and a server is used, the server program 206 may be implemented using the same software as the client program 106.

The data management server program 208 is software for managing data stored in the data storage part 26. The data management server program 208 is also provided with a function for reading out the data from the data storage part 26 in response to a file transfer request sent from the server program 206. Further, it is preferable that the data management server program 208 not only reads out the files stored in the data storage part 26 in their original forms, but also performs various operations such as extracting data from the file that satisfy predetermined conditions and combining a plurality of files. In the present embodiment, an SQL server program adapted to SQL (Structured Query Language) is used as the data management server program 206. With such a server program, it is possible to prevent unnecessary data from being transferred to the web server 10 and thus the load on the network can be reduced.

These software programs cause the data management server 20 to function as a data management device that forms a part of the web service system of the present invention.

Referring to FIGS. 3 through 19, presentation data-generating processes performed by the above-mentioned web server and the web service system will be described.

Figure 3:
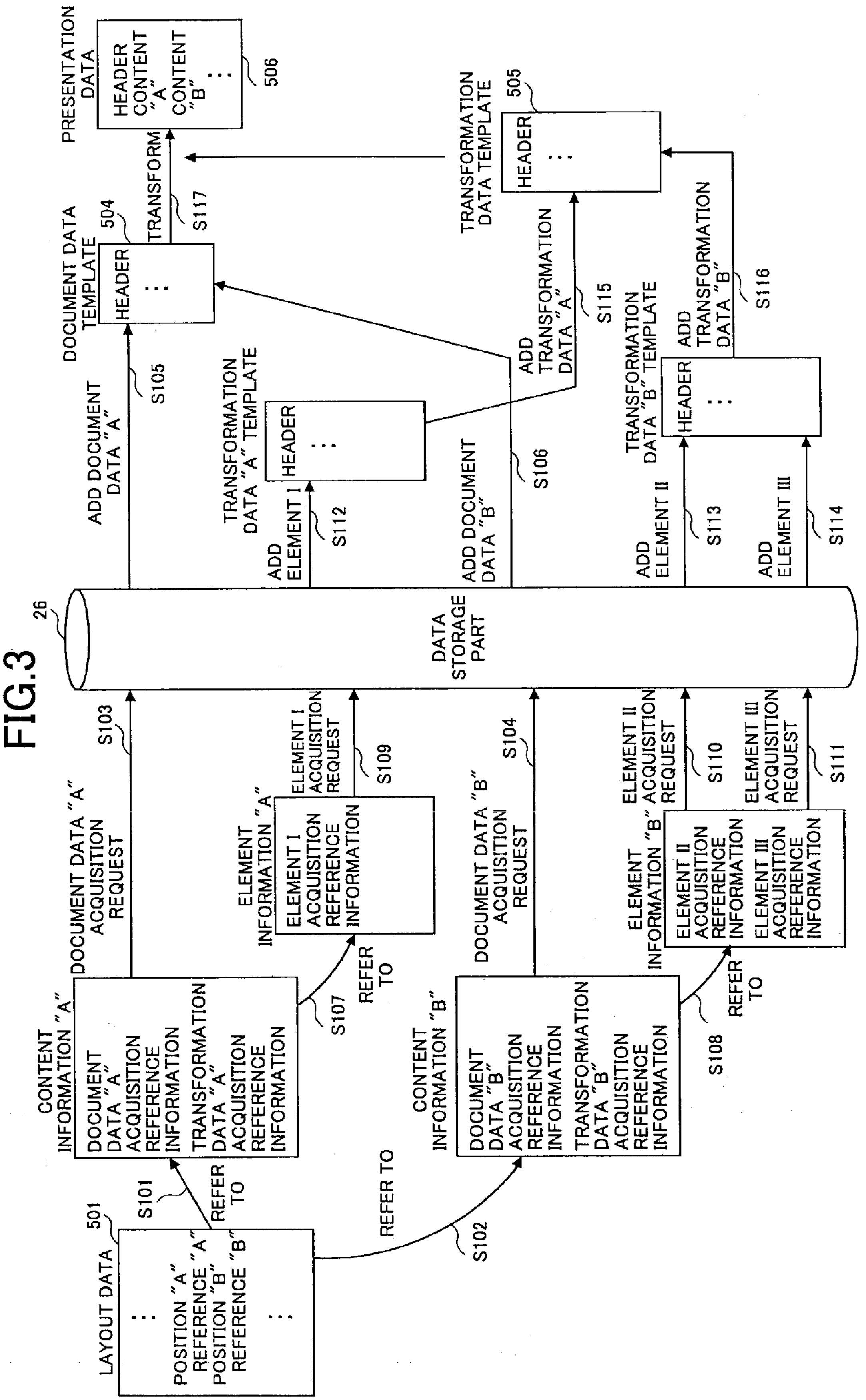
FIG. 3 is a diagram showing a presentation data-generating process performed in a web server that is an embodiment of a presentation data-generating device of the present invention.
Figure 4:
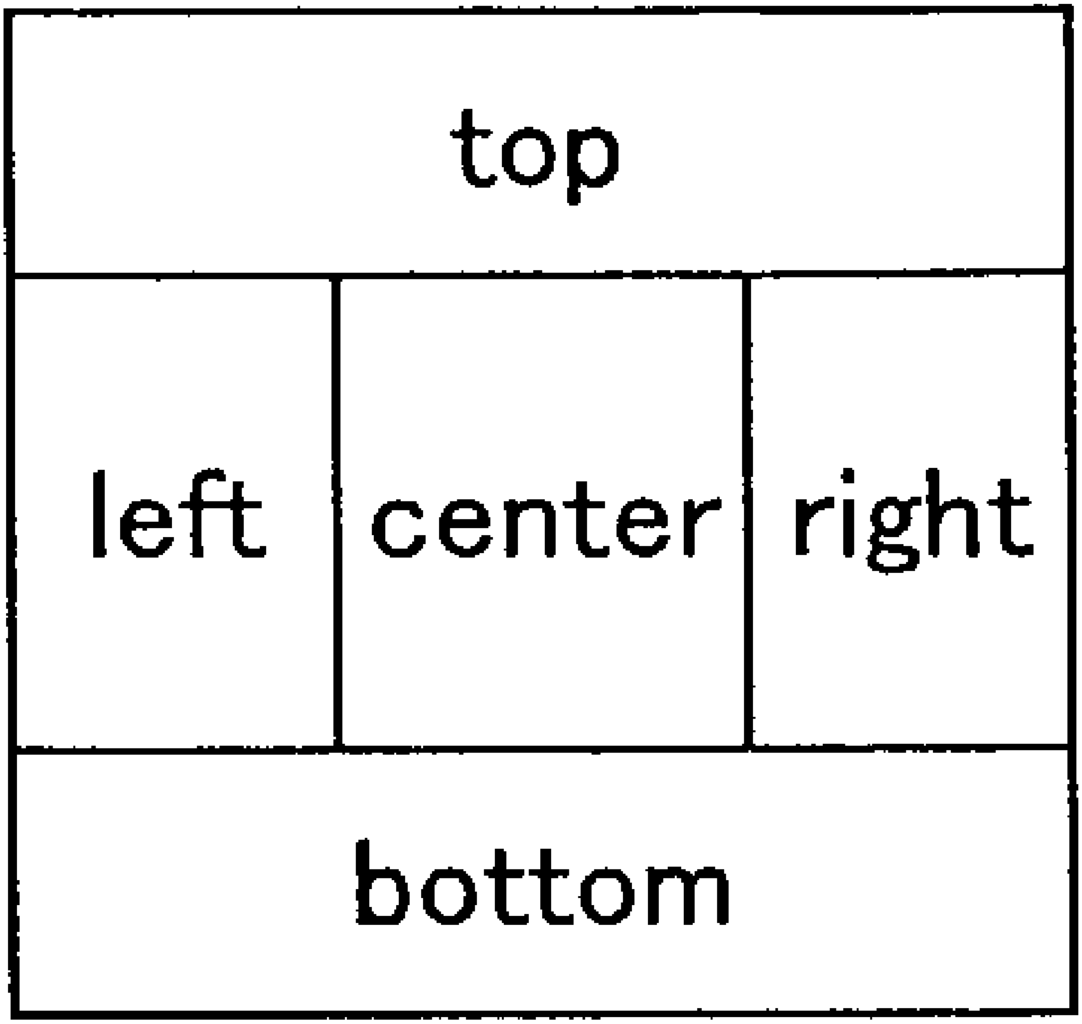
FIG. 4 is a diagram showing a manner in which the screen for presenting the presentation data generated in the presentation data-generating process of FIG. 14 is divided into blocks.
Figure 14:
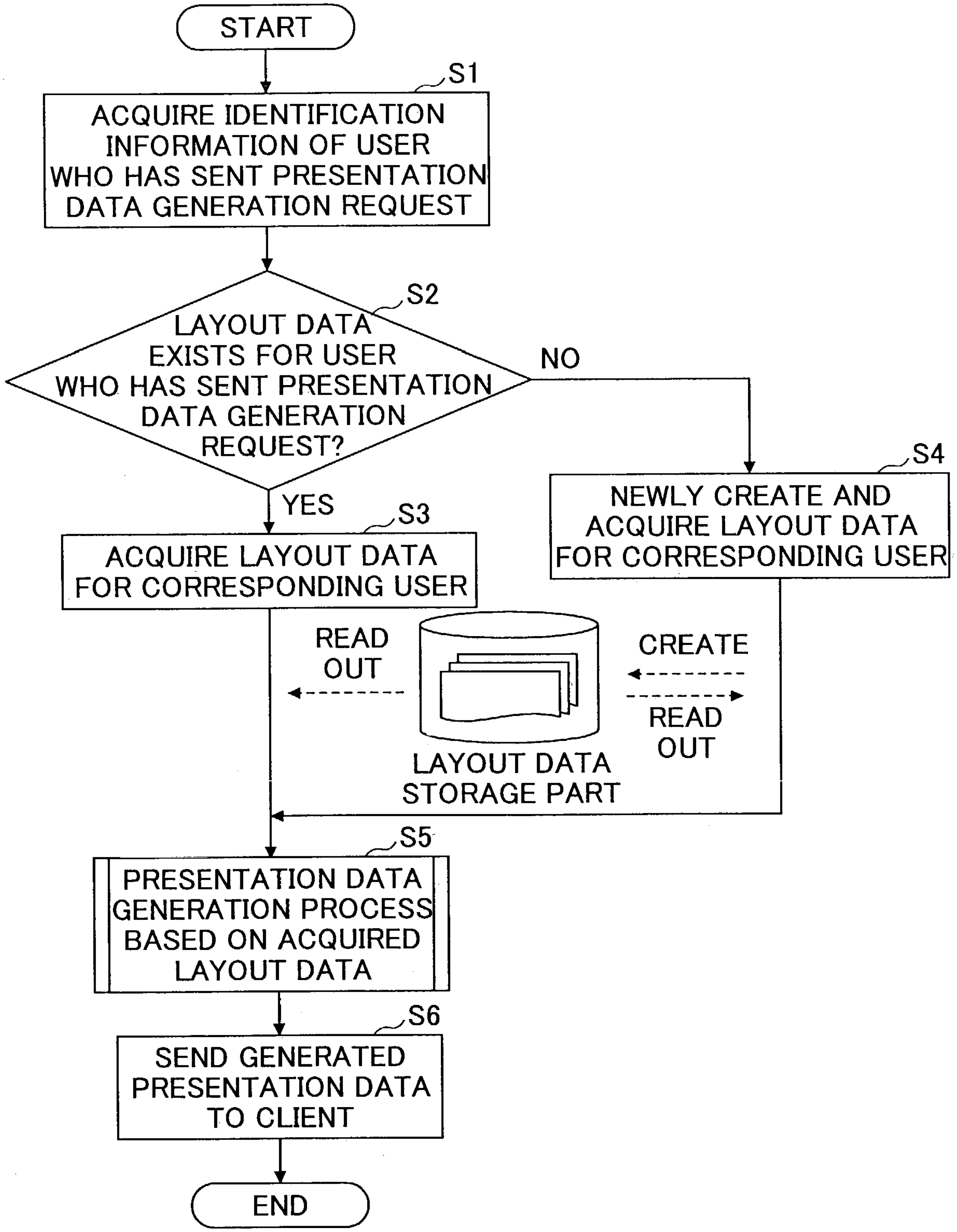
FIG. 14 is a flowchart showing a process of generating presentation data in the web server of an embodiment of the present invention.
Figure 15:
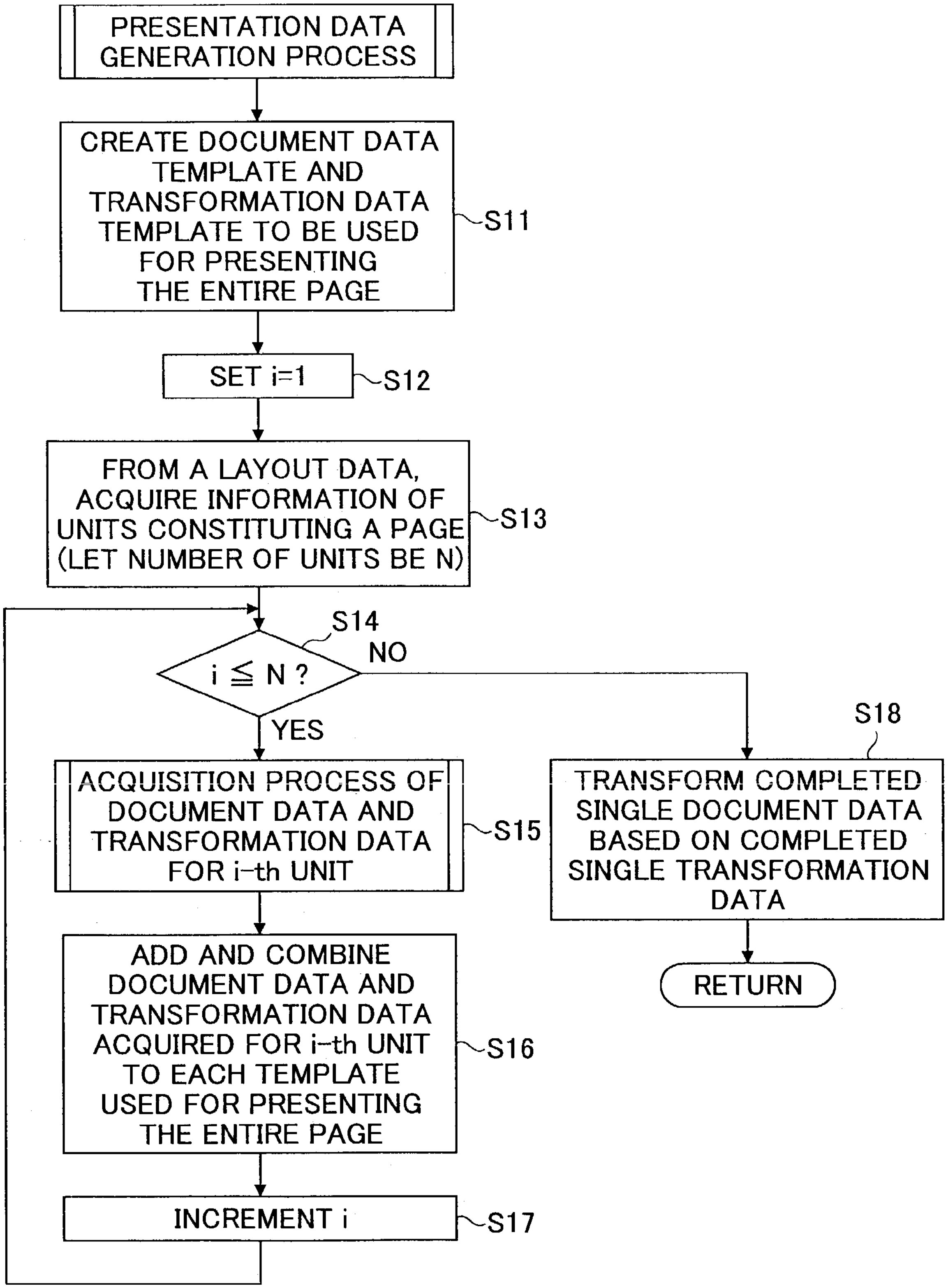
FIG. 15 is a flowchart showing a part of the process shown in FIG. 14 in more detail.
Figure 16:
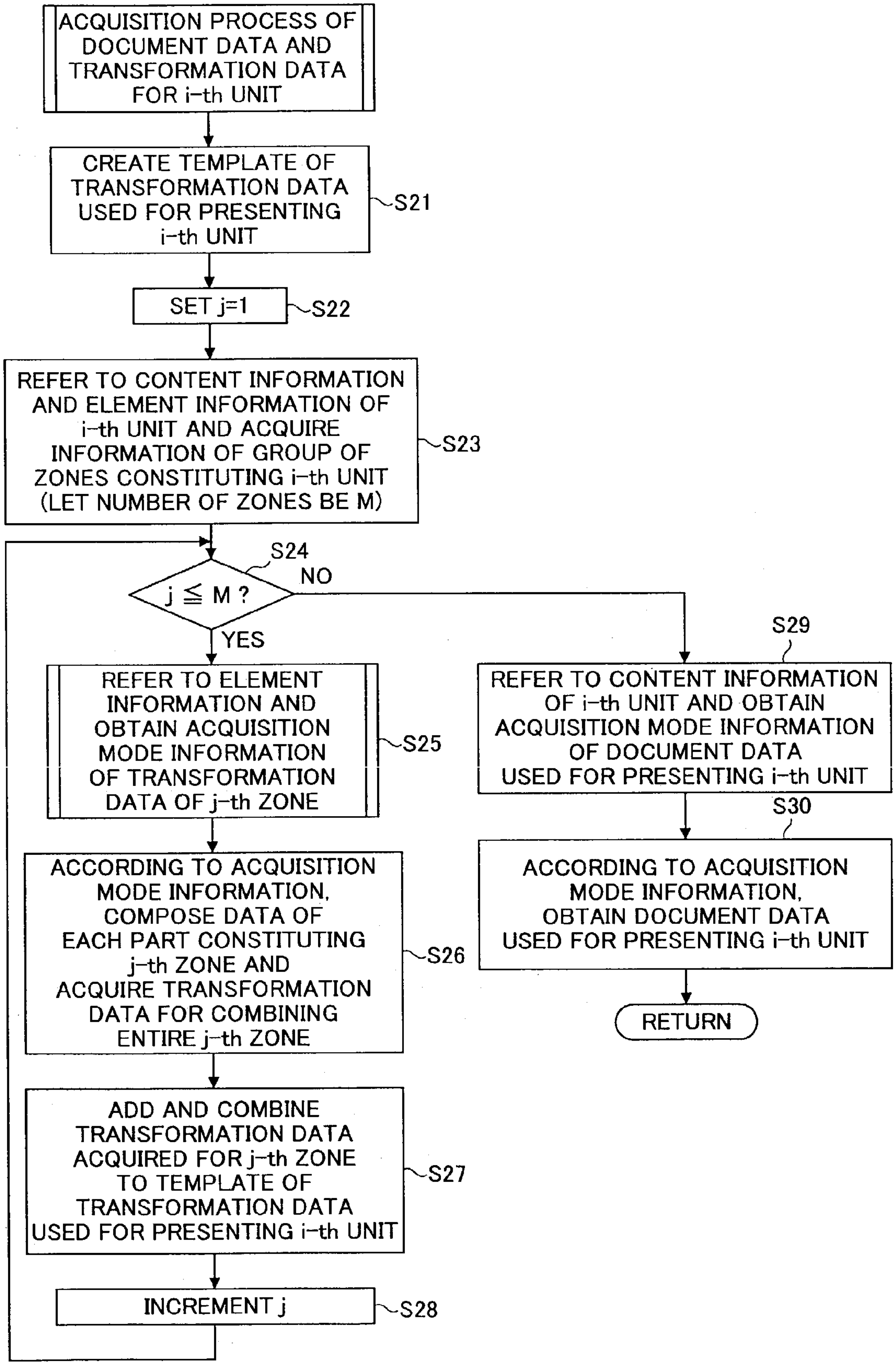
FIG. 16 is a flowchart showing a part of the process shown in FIG. 15 in more detail.
Figure 17:
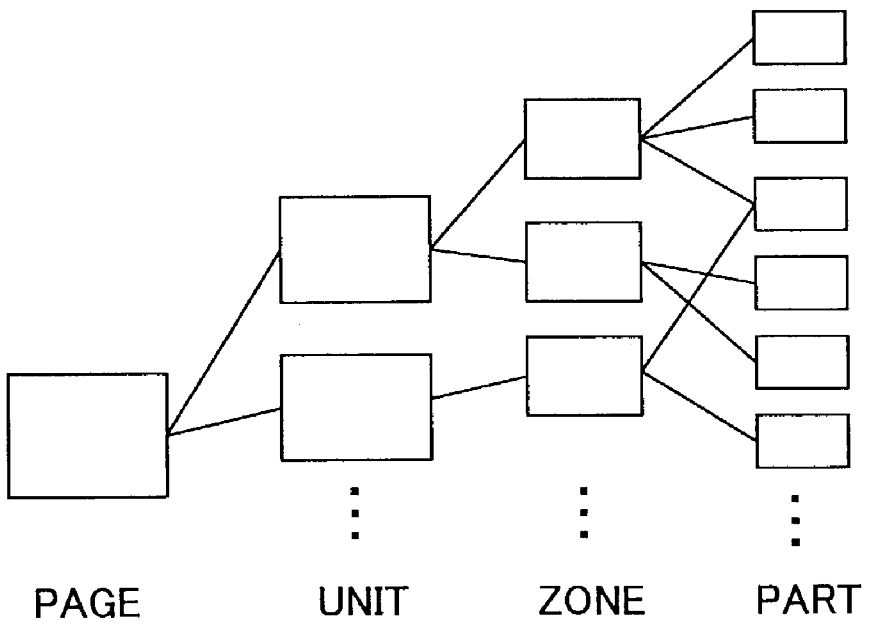
FIG. 17 is a diagram showing the structure of transformation data obtained in the presentation data-generating process of FIG. 14.
Figure 19:
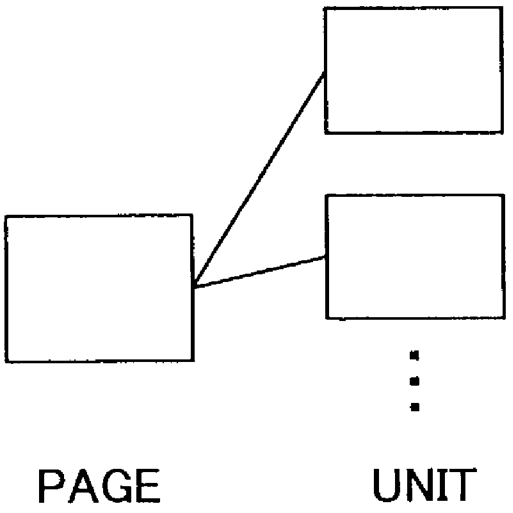
FIG. 19 is a diagram showing the structure of document data obtained in the presentation data-generating process of the present invention.

Briefly, FIG. 3 is a diagram for explaining the presentation data-generating process, FIG. 4 is a diagram showing a manner in which a display screen whereon contents of the document data is presented is segmented into blocks, FIGS. 14 through 16 are flowcharts showing presentation data-generating processes performed by the above-mentioned web server, FIG. 5 is a diagram showing an example of layout data, FIGS. 6 and 7 are diagrams showing examples of content information of FIG. 3, FIG. 17 is a diagram for explaining the structure of the transformation data and FIG. 19 is a diagram for explaining the structure of the document data.

First, the presentation data-generating process will be generally described with reference to FIG. 3. When the web server 10 receives a presentation data send request from devices such as a client PC 31, it generates presentation data in accordance with the layout data 501 that may be defined for each user.

The layout data 501 contains position information for each document data upon presenting contents of a plurality of document data sets. In detail, the layout data 501 shows positions of contents upon presenting the contents of the set of document data on a browser of the client device using the presentation data generated by the web server 10.

Also, the layout data 501 contains acquisition reference information (reference "A" and reference "B") indicating destinations to refer to upon acquiring a set of document data to be presented and a set of transformation data, each of the set of transformation data corresponding to respective one of the document data sets. The CPU 11 of the web server 10 obtains information of the destination to refer to from the acquisition reference information, and acquires the set of document data or the set of transformation data by referring to the destination indicated in the acquisition reference information. These processes will be described later.

Further, the layout data 501 may contain position information indicated in predefined blocks such as "top" and "left" and define the above-mentioned acquisition reference information for each block so as to specify the document data to be presented in the respective position and the transformation data corresponding to each document data set. The position of each of the blocks on the browser upon presenting the document data using the presentation data may be determined in accordance with a correspondence rule for transforming the document data into the presentation data. However, the positions of the blocks may be predefined as shown in FIG. 4. Referring to FIG. 3, POSITION "A" and POSITION "B" in the layout data 501 are information indicating blocks.

It is to be noted that each block may contain a single document data set to be presented or a plurality of document data sets to be presented. Further, a block may contain no document data therein.

FIG. 5 is a detailed diagram of the layout data 501. In this embodiment, the layout data 501 is also described in an XML format as in the case of the document data. In such a manner, the system design will be simplified since the layout data can be interpreted and modified in a similar manner to the document data and the transformation data. However, the layout data may be described in any other format.

A line of script 5011 in FIG. 5 specifies that the relevant layout data is a layout data set of a user identified by a user name "taro" Lines of script 5012 indicate attribute information related to the user "taro".

The layout data 501 of FIG. 5 is an example in which layout information is defined for each type of Web browser used by a device such as the client PC 31. In other words, lines of script 5013 define layout information for a case in which the client sending a request for presentation data to the web server 10 has a Web browser for a general PC (Personal Computer). Lines of script 5014 define layout information for a case in which the client sending a request for presentation data to the web server 10 has a Web browser for a PDA (Personal Digital (Data) Assistant).

For example, the lines of script 5013 include a line of script 5013*a* tagged by a <top> tag that defines a definition corresponding to a block "top". In other words, "uri=search.xml" is the acquisition reference information pointing to the destination to refer to for the document data to be presented and the transformation data corresponding to the relevant document data. The acquisition reference information indicates that information regarding the destination to refer to acquire the document data to be presented in block "top" is contained in a file having a file name "search.xml".

Similarly, a line of script 5013*b* indicates that the destination to refer to for acquiring the document data to be presented in block "left" and the transformation data corresponding to the relevant document data is contained in a file with a file name "services.xml". Also, <right/> in a line of script 5013*c* indicates that there is no document data to be presented at the position of a block "right".

The web server 10 acquires the content information for each block in accordance with acquisition reference information defined for each block in the layout data 501 (FIG. 3, S101 and S102). In the content information, for example content information "A" and "B", acquisition reference information of the document data and the transformation data are described for each of the blocks.

FIGS. 6 and 7 show examples of the content information. In this embodiment, the content information is described using an XML format as in the cases of the layout data and the document data. In such a manner, the system design will be simplified in a similar manner to the layout data. However, the content information may be described in any other format.

For example, in an example shown in FIG. 6, information indicated in lines from a tag <value> on the third line and a tag </value> on the eighth line is the acquisition reference information. The destination to refer to for the required document data is described between these tags. In an example shown in FIG. 7, information indicated in the third to twelfth lines is acquisition reference information. On the fourth line, it is described that the document data can be acquired by executing a class module "jp.cp.ricoh. -----.FolderAndDocumentListUnit" using parameters described on the fifth through eleventh lines. In this case, the document data is acquired by dynamically generating it by a process performed by the class module.

In the content information shown in FIGS. 6 and 7, information on the second line from the bottom is the reference information showing a destination to refer to for obtaining element information. As has been described above, acquisition reference information of the document data may be directly described in the content information. On the other hand, for the layout data, acquisition reference information for referring to element information indicating elements constituting the transformation data may be recorded in the content information.

Herein, an "element" is to be understood as data serving as the transformation data for subdivided regions (zones) of the block and constitutes a part of the transformation data corresponding to the block. "Element information" is to be understood as information containing acquisition reference information of the transformation data for each zone.

In FIG. 6, it is shown that the element information is stored in a file with a filename "ServiceList.unit.xls" and in FIG. 7, it is shown that the element information is stored in a file with a filename "FolderAndDocumentList.unit.xls". Acquisition reference information of the document data will be described later.

In accordance with the acquisition reference information defined in the content information, the web server 10 sends an acquisition request of the document data for each block to the storage part 26 of the data management server 20 (FIG. 2, steps S103 and S105) and acquires the document data (document data "A", document data "B", etc.) It is to be noted that the document data is not only acquired from the data storage part 26 but may also be acquired from any other source. That is to say, the document data can be acquired from any other source that can be specified by the acquisition reference information. Such sources may be the HDD 14 of the web server 10 or any other source that can acquire information from the web server 10.

FIG. 8 shows an example of the document data. In FIG. 8, lines of script 5041 tagged with a tag <content> show the content of the information to be presented in one of the blocks of the presentation data.

Then, the web server 10 adds the document data that have been acquired separately for each block into the document data template 504 which is a predefined template of the document data corresponding to a single page of the presentation data. Thus, the document data for a single page can be generated (FIG. 3, steps S105 and S106).

FIG. 9 shows an example of the document data template. In FIG. 9, document data for each block is added in a block-by-block manner to a line of script 5042.

In parallel to the generation of the document data for a page, the web server 10 generates the transformation data for a page. In other words, the web server 10 refers to the element information (element information "A" and element information "B") in accordance with the acquisition reference information pointing to the element information described in the content information (FIG. 3, steps S107 and S108).

FIG. 10 shows an example of the element information. In FIG. 10, a line of script 5031 is the acquisition reference information for elements of the transformation data. In other words, in an example of FIG. 10, it is indicated that elements are stored in a file "FolderAndDocumentList.zone.xsl".

Then, the web server 10 acquires the elements constituting the transformation data from sources such as the data storage part 26 in accordance with the acquisition reference information for the elements described in the element information (FIG. 3, steps S109, S110 and S111). As has been explained for the case of the document data, the source of the elements is not limited to the data storage part 26 but may also be acquired from any other appropriate source.

As has been noted above, the element is a transformation data corresponding to a zone. Therefore, the element contains definitions related to transformation. Further, regions smaller than zones (hereinafter referred to as "parts") may be defined and the transformation data for a "part" may be referred to from the element.

FIG. 11 shows an example in which transformation data corresponding to a "part" is referred to from the element. In FIG. 11, a line of script 5032 is the acquisition reference information to the transformation data corresponding to a "part". That is to say, the line of script 5032 indicates that the transformation data of the "parts" constituting the relevant zone are stored in "CurrentViewInfo.xsl".

Then, the web server 10 adds the elements that have been acquired separately for each zone into transformation data templates (transformation data template "A" and transformation data template "B"). The transformation data template is a template of document data corresponding to each block that is created in advance. Thus, the transformation data for each block is generated (FIG. 3, steps S112, S113 and S114).

FIG. 12 is an example of the transformation data corresponding to each block. The transformation data of FIG. 12 is associated with the document data of FIG. 8. In other words, a line of script 5051 indicates a definition of an output of a title character string and lines of script 5052 and 5053 define style information for the information described in the lines of script 5041 in FIG. 8.

Further, the web server 10 merges the transformation data for each block with the predefined transformation data template 505. The transformation data template 505 is a template of the transformation data corresponding to a page of the presentation data (FIG. 3, steps S115 and S116).

FIG. 13 shows an example of the transformation data template. In FIG. 13, the transformation data for each block is to be added in a block-by-block manner to a position indicated by reference numeral 5054.

Finally, the web server 10 performs a predetermined transformation to generate presentation data 506 for presenting the contents of the document data of a page in accordance with the style defined in the transformation data for the corresponding page (FIG. 3, step S117).

The above description has been made to generally explain the presentation data-generating process. In the following description, an operation of the web server 10 for generating the presentation data will be described in detail with reference to the flowcharts. Hereinafter, the above-mentioned term "block" is to be expressed by a term "unit".

When the user makes an access to the web server 10 by specifying a certain URL (Uniform Resource Locator) using browser software of the client device (client PC 31 in the present embodiment), the web server 10 receives a page display request, i.e., a presentation data generation request, from the client device. Reception of a generation request is one of the processes of the display request reception procedure. When executed, a part of the server-side program module 108 causes the CPU 11 to serves as a display request reception part that always performs reception of the generation request.

Upon reception of this request, remaining parts of the server-side program module 108 are executed by the CPU 11 so as to perform the processes shown in the flowchart of FIGS. 14 through 16. In other words, when executed, any appropriate program contained in the server-side program module 108 causes the CPU 11 to function as various parts described below.

In step S1 of FIG. 14, identification information of the user sending a presentation data generation request is acquired. This may be performed by allowing the user to input authentication information such as ID or password as the identification information or by pre-recording information such as Cookie as the identification information into the client device and reading it as required. It is to be noted that the latter acquisition process may only be used in an environment in which identification information can be stored and read out for each user. When using the former acquisition process, it is advantageous to perform an authentication process using authentication information that is acquired together with the identification information. Also, the identification information may be acquired from any other sources such as an external authentication server.

The process performed in the above-described step S1 is an identification information acquisition process. In this embodiment, the CPU 11 serves as an identification information acquisition part.

In step S2, in accordance with the acquired information, it is determined whether there exists layout data corresponding to the user who has sent the generation request.

If the result of step S2 is positive, the process proceeds to step S3 to acquire the layout data corresponding to the user. The layout data may be contained in profile information for each user in which data items such as user ID, password, e-mail address and division name are stored. In such a case, necessary data is extracted and acquired from the profile information.

If the result of step S2 is negative, the process proceeds to step S4 to newly create layout data (FIG. 5) corresponding to the user and acquire the created layout data. Creating new layout data may be performed by adding necessary data into a template prepared in advance.

In the present embodiment, identification data is acquired from the layout data storage part which is a database storing layout data corresponding to each user, however, there is no particular limitation for the position where the layout data storage part is provided. The layout data storage part may be provided in the HDD 14 of the web server 10 or in a storage part of any other device that is accessible from the web server 10. Considering the ease of access, the layout data storage part is preferably provided internally in the web server 10.

The processes performed in the above-described steps S2 through S4 correspond to a layout data acquisition procedure. In this embodiment, the CPU 11 serves as the layout data acquisition part.

After acquiring the layout data in step S3 or step S4, it proceeds to step S5 to perform the presentation data generation process that has been described above with reference to FIG. 3 in accordance with the acquired layout data. FIG. 15 is a detailed flowchart of the process of step S5.

In the presentation data generation process, a document data template 504 and a transformation data template 505 to be used for presenting the entire page are created in step S11.

In the presentation data generation process, a single unified document data set is generated by arranging a plurality of document data sets to be presented in an appropriate order and adding layout information contained in the layout data while generating a single unified transformation data set by arranging corresponding transformation data in an appropriate order. As can be seen in FIG. 3, these unified data are generated by adding the acquired data to a predetermined template one after another. A template created in step S11 is a template that is for this purpose.

It is to be noted that XML, XSL or HTML formats used here contain version information and headers for defining required statements. Accordingly, it is preferred that the templates contain such headers and also data used for adding headers necessary for a transformation process of the presentation data.

Also, it is not necessary that the above-described template, other templates shown in FIG. 3 and described below, document data and transformation data and elements thereof that are acquired and added thereto, data generated by adding each data set and element to the template and the finally generated presentation data be in the form of files. These may be handled by storing them as data in a memory such as the RAM 13.

In step S12, a counter i is set to 1. In step S13, the layout data is interpreted and information related to units constituting a page, i.e., document data to be located, is obtained. This information contains number of document data sets and acquisition reference information for each document data set (and required transformation data). Stated otherwise, one unit of data corresponds to data acquired by referring to one of the acquisition reference information items in the layout data. Then, the number of document data (number of units) is set to N and it proceeds to step S14.

In step S14, it is determined whether i is less than or equal to N. If i is less than N, the process proceeds to step S15.

In step S15, an acquisition process of the document data and the transformation data for i-th unit is performed. Here, since i=1, an acquisition process for the first (1st) unit is performed. FIG. 16 is a flowchart showing an acquisition process of the document data and the transformation data for the i-th unit.

In step S21, a template of the transformation data used for presenting the i-th unit is created.

In the acquisition process of the document data and the transformation data, the transformation data is acquired in the following manner. First, element information indicating elements constituting the transformation data are acquired. Then, based on the element information, elements constituting the transformation data are acquired and necessary transformation data is acquired by combining the acquired elements. As can be seen in FIG. 1, the necessary transformation data is acquired by adding the acquired elements one after another to the predetermined template. The template created in step S21 is a template for this purpose.

As has been stated in the description for the template created in step S11 in FIG. 15, the template may preferably contain items such as a header.

In step S22, a counter j is set to 1. Then, in step S23, in accordance with the acquisition reference information corresponding to the i-th unit in the layout data, the content information (FIGS. 6 and 7) and the element information (FIG. 10) in which acquisition reference information of the document data and the transformation data are described are referred to. Thus, information of a group of zones constituting the i-th unit is acquired.

The acquisition reference information in the layout data can only directly refer to the content information. As can be seen in FIG. 3, the layout data contains acquisition reference information directly pointing to the document data, but for the layout data, it contains acquisition reference information that points to element information for referring to elements constituting the transformation data. Referring to the element information in accordance with the acquisition reference information, information containing acquisition reference information for the elements are stored as element information of elements constituting transformation data for the i-th unit. One of the elements corresponds to one of the zones. Each element is transformation data defining a rule for transforming a part of the document data of the i-th unit into presentation data for presenting the contents.

In the process of step S23, the acquisition reference information is followed sequentially so as to acquire information of a group of zones constituting the i-th unit. Then, the number of zones is set to M and it proceeds to step S24.

In step S24, it is determined whether j is less than or equal to M. If j is less than or equal to M, the process proceeds to step S25.

In step S25, acquisition reference information for the transformation data of the j-th zone (for example, element I) is obtained by referring to the element information. The acquisition reference information is described as information such as "which file (or data) stored in which position is to be acquired" or "which device is to perform which process for generating the transformation data". In the present embodiment, each element of each zone further includes more than one "part" and the acquisition reference information is described as a collection of acquisition reference information for all "parts". Each "part" is transformation data defining a rule for transforming a "part" of the document data into the presentation data presenting the contents.

Then, in step S26, data of "parts" constituting the j-th zone are acquired and combined in accordance with the acquisition reference information obtained in step S25, so as to acquire the transformation data of the j-th zone. Data of each "part" may be acquired from the data storage part 26 of the data management server 20 or from the HDD 14 of the web server 10. However, as long as it is possible to acquire information from the web server 10, data of each part may be acquired from any other sources. If SOAP is used for acquisition, acquisition requests may be sent using XML data and responses can be received as XML data. Accordingly, processing of the acquired data can be facilitated.

In FIG. 3, for the sake of clarity, acquisition requests from the elements are illustrated as a single arrow, but transformation data can be acquired from different positions for respective "parts". Also, the transformation data can be acquired from different positions for respective elements.

Data of the "parts" can be performed using "include" and "import" functions that are prepared in XSL.

After step S26, it proceeds to step S27 wherein the transformation data of the j-th zone acquired in step S26 is added and combined to the template of the transformation data used for presenting the i-th unit.

It is to be noted that the XSL data that describes the transformation data contains a header per file. Accordingly, simply connecting a plurality of XSL data sets does not provide data that can be handled as data having a combined content of the plurality of XSL data sets. In order to create XSL data having a combined content of the plurality of XSL data sets, portions containing contents other than the header of transformation data to be added should be extracted, and sequentially embedded into predetermined positions of the template in which a header and necessary statements are provided. In the present invention, such a process is referred to as a "combining" process. This also applies for the case of XML data describing the document data.

After step S27, it proceeds to step S28 and increments j by 1 and returns to step S24 to repeat the process.

The process performed in the above-described steps S21 through S28 is a transformation data acquisition procedure. In this embodiment, the CPU 11 is caused to function as the transformation data acquisition part.

If the result of step S24 is negative, i.e., j is not less than or equal to M, it can be considered that the transformation data used for presenting the i-th unit is completed. Then, the process proceeds to step S29.

In step S29, acquisition reference information of the document data used for presenting the i-th unit is obtained by referring to the content information of the i-th unit.

As can be seen in FIG. 3, acquisition reference information of the document data is described in the content information that can be referred to in accordance with the acquisition reference information in the layout data. In a similar manner to the transformation data of the above-mentioned zones, the acquisition reference information is described as information such as "which file (or data) stored in which position is to be acquired" or "which device is to perform which process for generating the document data".

After step S29, it proceeds to step S30 in which the document data used for presenting the i-th unit is acquired in accordance with the acquisition reference information acquired in step S29. In a manner similar to the data of parts constituting the transformation data, the document data can be acquired from the data storage part 26 of the data management server 20 using communications based on SOAP and any other source capable of acquiring information from the web server 10 by specifying with the acquisition reference information.

In FIG. 3, for the sake of clarity of illustration, acquisition requests for the document data and for the elements of the transformation data are sent to the same data storage part. However, destinations of the acquisition requests can be independently set for each acquisition request.

If the acquired document data in its original form is not suitable for being subjected to a transforming process, a necessary deformation (shaping) process is performed.

It is preferable that this shaping process include a process of adding information of layout contained in the layout data, i.e., information indicating at which position of the screen the data acquired for presenting the i-th unit is to be located, is added to the document data. However, it is not necessary to perform this process at this stage. This process may be performed during the combining process of the document data described later. Also, the description format of the information of layout to be added may be different as long as the meaning is the same as that in the layout data.

The process performed in the above-described steps S29 and S30 is a document data acquisition process. In this embodiment, the CPU 11 is caused to function as the document data acquisition part.

After the process of step S30, it returns to a process of FIG. 15 and proceeds to step S16. Then, the document data and the transformation data acquired for the i-th unit in the acquisition process of step S15 are respectively added and combined to the document template and the transformation data template used for presenting the entire page which are prepared in step S11. The "combining" process has already been mentioned in the description of step S27 of FIG. 16.

After step S16, it proceeds to step S17 in which i is incremented by 1. Then, it returns to step S14 to repeat the process.

If it is determined in step S14 that i is not less than or equal to N, it can be considered that acquisition and combination of the document data and the transformation data has been completed for all the units. Then, the acquired plurality of document data sets is arranged in an appropriate order. Accordingly, it is considered that a single unified document data set whereto information of the location contained in the layout data is added and a single unified transformation data set in which the acquired transformation data are arranged in an appropriate order are completed. Then, it proceeds to step S18.

In step S18, the completed single unified document data set is transformed into presentation data based on the completed single unified transformation data set so as to generate a single unified presentation data set for presenting the contents of the document data at positions indicated by the layout data. Such a transformation process can be achieved by developing the XML format document data into a tree format by means of the XML parser 104 illustrated in FIG. 2 and performing a transformation process based on the XSL format transformation data by means of the XSL processor 105.

It is important to know which data among the data constituting the completed single unified document data set is located at which position when transformed into the presentation data. That is to say, when the HTML data is to be presented on a browser, the browser normally presents data in a sequential manner from the beginning of the data from top to bottom of the screen. When data are to be presented in a horizontally aligned manner, the data are presented from the beginning from the left side of the screen towards the right side. Accordingly, the content to be located at the top or at the left of the display screen should be arranged near the beginning in the presentation data set than those contents to be located at the bottom or the right of the display screen.

Accordingly, in the transformation process of the present embodiment, the transformation process is performed sequentially by starting from a unit containing data to be arranged at the beginning.

The order may be determined using the information of layout added to a single "unified document data". For example, when the layout is indicated on a block-by-block basis, information indicating a block to be located (it is not necessarily the same as the description in the layout data but the meaning is to be the same) is added for each unit as information of layout. For example, in order to locate the blocks as shown in FIG. 4, information (tag) indicating blocks in the single "unified document data" can be interpreted such that data to be presented in a block "top" is the first, data to be presented in a block "left" is the second, etc. Such an interpretation may be performed by creating a table in which rules defining an order of description within a single "unified document data set" and a relationship between tags and order of transformation and by referring to this table. If there is any block without any contents to be presented, the layout may be shaped such that the relevant block is combined with neighboring blocks.

It is also possible to refer to the layout data and arrange the data of each unit in an order necessary for generating the presentation data during a process of generating the single "unified document data set". Then, in the above-mentioned transformation process, the process is simply performed in accordance with the order in which the units are described in the single "unified document data set".

Also, in this transformation process, depending on the content of the transformation data, only the contents that are necessary for presentation may be selected from the document data. Then, the transformation process is only performed on the selected contents.

The process performed in the above-described steps S11 through S18 is a presentation data generation process. In this embodiment, the CPU 11 is caused to function as the presentation data generation part. (As has been described with reference to FIG. 16, the process of step S15 is the document data acquisition procedure and the transformation data acquisition procedure.)

After the process of step S18, it returns to the process shown in FIG. 14 and proceeds to step S6. In step S6, the presentation data generated in step S18 of FIG. 15 is transmitted to the client and the process is terminated. On the client-side, the browser performs a display operation based on this presentation data.

It is to be noted that even if a series of processes is terminated, the server-side program module 108 does not stop running and enters a reception standby mode for a new display request.

Thus, by generating a single unified presentation data set for presenting the contents of a plurality of document data sets to be presented at positions indicated by the layout data, a process of presenting contents of document data sets on the same page can be performed in a facilitated manner. Further, contents of the plurality of document data sets can be presented with a desired layout.

Further, according to the present invention, the acquired plurality of document data sets are arranged in an appropriate order. Then, the single unified document data set whereto the information of the layout contained in the layout data is added is transformed in accordance with the single unified transformation data set in which the acquired transformation data are arranged in an appropriate order and in accordance with the added information of the layout. Thus, a unified presentation data set is generated. Accordingly, the presentation data for presenting the contents of the plurality of document data sets on a single page can be generated in a facilitated manner.

Further, according to the present invention, the layout data contains acquisition reference information indicating the destination to refer to for acquiring the document data to be displayed and the conversion data corresponding to the document data. The document data and the transformation data are acquired by referring to the acquisition reference information. Therefore, the contents to be presented can be easily altered by altering the reference information. Thus, the designing and customizing of the display screen is facilitated. Also, by minimizing the contents to be described in the layout data, the size of data can be reduced.

Further, according to the present invention, in the layout data, positions of the contents to be presented of a plurality of document data sets are indicated in a block-by-block unit. In other words, in conformity with the above-mentioned feature, the layout data contains, for each block, the document data to be presented at the position of the block and the acquisition reference information for referring to the acquisition reference information of the transformation data corresponding to the relevant document data. Therefore, in addition to the above-mentioned advantages, the present invention is advantageous since the position of location of the contents to be presented can be easily specified. Also, the order in which each document data set is to be arranged upon transformation into presentation data can also be specified in a facilitated manner.

Further, the transformation data is acquired by acquiring element information indicating elements constituting the transformation data, acquiring elements constituting the data in accordance with the element information and combining the acquired elements. In other words, as can be seen in FIG. 17, the transformation data is configured as a hierarchical structure of pages (corresponds to all transformation data necessary for generating a single unified presentation data), units, zones and "parts", such that the entire transformation data set can be acquired by collecting components of lower levels by sequentially following the hierarchical structure from upper levels. Thus, by altering the acquisition reference information at each level and by rearranging in a component-by-component basis, the transformation data can be altered in a facilitated manner and designing can also be facilitated. Also, customization is facilitated and the presentation format can be altered as desired by the user.

Further, if the acquisition reference information is set such that the destination of reference is altered in accordance with conditions, alteration of the display in accordance with conditions or operations can be facilitated. Also, as shown in FIG. 17, it is possible for a plurality of higher level data sets to share the same lower level data. Accordingly, the amount of necessary data can be reduced as a whole and the size of data can be minimized.

Figure 18:
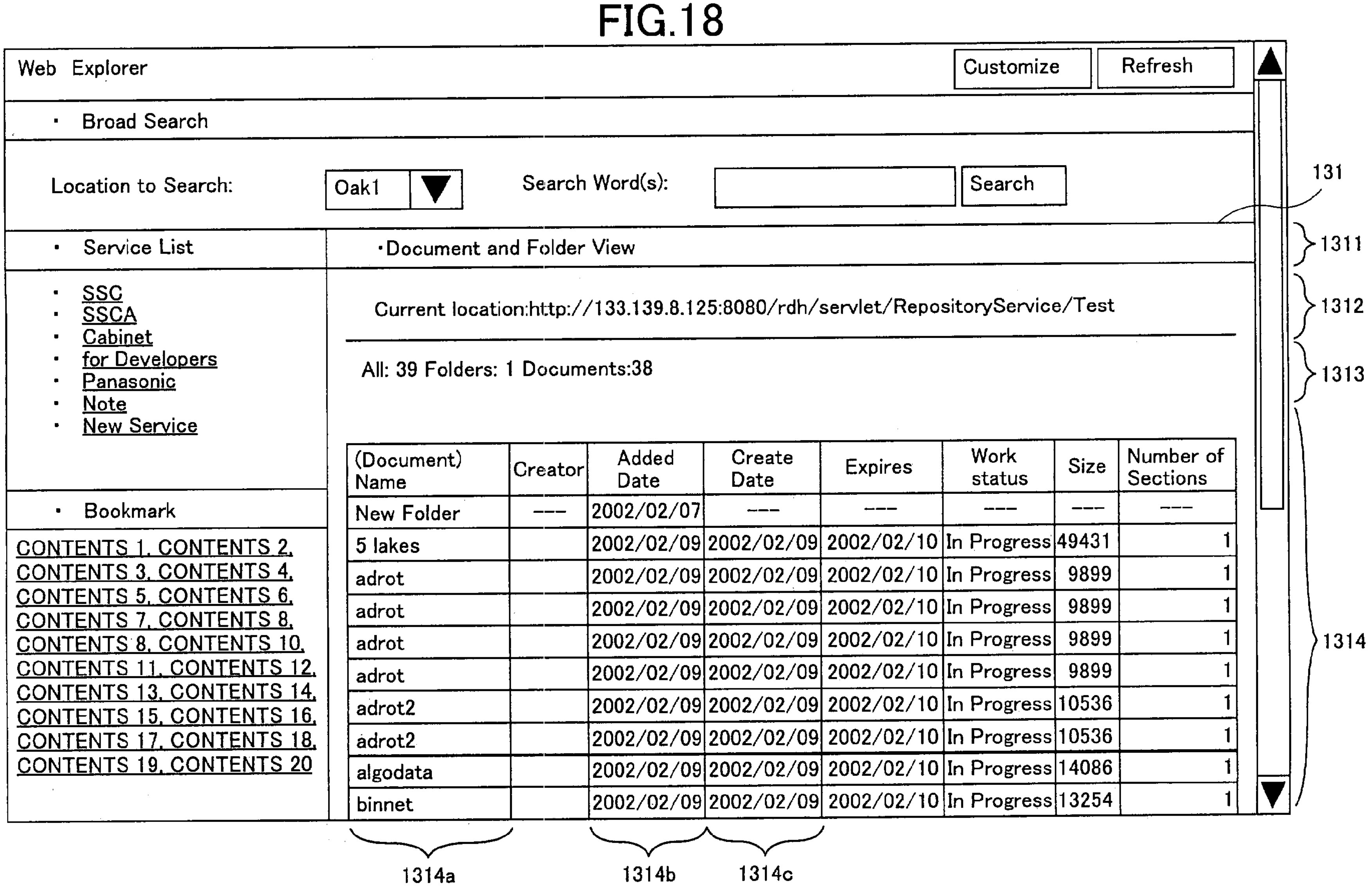
FIG. 18 is a diagram showing an example of a display screen obtained by the presentation data generated by the presentation data-generating device of the present invention.

Now, for ease of understanding, terms "page", "unit", "zone" and "part" will be described with reference to an example showing how the contents of the presentation data are presented. FIG. 18 shows an example of the display screen generated in accordance with the presentation data by the presentation data-generating device of the present invention.

In FIG. 18, the entire rectangular region of FIG. 18 corresponds to a page. That is to say, the entire screen presented on devices such as a Web browser is a single page.

When a page is divided into a plurality of regions, each region corresponds to a unit. A unit does not depend on other units and offers one function per unit. In an example of FIG. 18, there are four units titled "Broad Search", "Service List", "Bookmark" and "Document and Folder View".

Each region constituting a unit corresponds to a zone. A zone is associated with other zones in the same unit. In FIG. 18, a unit 131 ("Document and Folder View") is constituted from a zone 1311 for presenting the title of the unit 131, a zone 1312 for presenting the position of the current display folder, a zone 1313 for presenting the total number of objects within the display folder and a zone 1314 for presenting a list of objects.

A zone is constituted of one or more "parts". Basically, each of the components (buttons, links, etc.) constituting a user interface in the presentation data corresponds to a "part". For example, in zone 1314, each column or each cell constituting a chart corresponds to a "part". In the chart in zone 1314, each column displays different types of information. For example, column 1314*a* is a column presenting the name of objects, i.e., normal character string and columns 1314*b* and 1314*c* are columns presenting dates. In such a case, the transformation data corresponding to a "part" of column 1314*a* defines that supplied character strings are output in its original form. However, the transformation data corresponding to the "parts" of column 1314*b* and 1314*c* need to be defined such that the supplied values are output in a date form. Accordingly, the transformation data of the "part" of column 1314*a* and the "part" of column 1314*b* will be different, but the transformation data of the "part" of column 1314*b* and the "part" of column 1314*c* may be the same.

With such segmentation down to the level of "parts", the transformation data can be used in common between the "parts". Accordingly, reduction of the cost of development and the amount of required transformation data can be achieved.

On the other hand, for the document data, as shown in FIG. 19, there are only two levels of pages (corresponds to all transformation data necessary for generating a single unified presentation data) and units in the hierarchical structure. It is not necessary to divide contents of the document data in many levels since if the transformation data is specified in an appropriate manner, data unnecessary for display can be excluded at the transformation step. Also, if there are many levels, the number of data acquisition requests is increased and thus communication control becomes more complicated. However, the document data may also be configured as data having a hierarchical structure with as many levels as that of the transformation data.

Also, since the identification information of the user sending the generation request for presentation data is acquired, layout data corresponding to the relevant user is acquired based on the identification data and the generation operation of the presentation data is performed based on the layout data, it is possible to perform a display operation according to preference and needs for each user. Also, information of the history of previous operations may be stored for later presentation based on such information.

The above example relates to a case in which the layout data is defined for each user. However, it is also possible to define the layout data for each user or for each device-type of the client such that the presentation data is presented with different layouts.

In a case where the layout data is defined for each client, information contained in the client information (IP address, machine name, etc.) transmitted from the Web browser of the relevant client may be used as identification information for identifying each client. In such a case, the presentation data can be presented by performing similar processes for the case in which the layout data is defined for each user, except that the layout data corresponding to the client is to be acquired based on such identification information. In such a manner, the presentation data can be presented differently, as required, for each client sending presentation requests. For example, the presentation data can be presented differently for the client installed at home and for the client installed at the office.

Information indicating the type of client, i.e., PC or PDA, or information indicating types or versions of the operating system or the browser that are contained in the client information transmitted from the Web browser can be used as identification information for identifying the device-type of the client. In such a case, the presentation data can be presented by performing similar processes for the case in which the layout data is defined for each user, except that the layout data indicating a layout suitable for presenting on the type of device indicated by the device-type information is to be acquired based on such device-type information.

In such a manner, the display can be adapted for the performance of the display device. For example, it is often the case that the amount of contents that can be presented on the browser of a PDA is less than the amount of contents that can be presented on the browser of a PC. Accordingly, if there is a presentation request from the PDA, the presentation data is generated that is for presenting a simplified screen as compared to the screen of a PC.

In such a case, along with an acquisition of the user identification information, it is preferable to prepare a plurality of layout data sets in accordance with the device sending the presentation request, such that an appropriate layout data can be selected for the device that has actually sent the presentation request.

The advantages achieved by the above-mentioned features can also be achieved when these features are individually applied to the presentation data-generating device of the present invention.

Also, as in the case of the above-mentioned web service system, it is advantageous that the presentation data-generating-system includes the web server 10 and the data management server 30 so that the web server 10 can acquire required data from the data management server 30. With such a configuration, functions of storing and operating a large amount of data can be centralized in the data management server 30. Therefore, it is possible to reduce the cost while facilitating the management of data.

In the above-mentioned embodiment, the web server 10 receives the presentation data generation request from external client devices. However, the web server 10 may generate presentation data in accordance with a presentation data generation request sent from an internal part of the device.

Further, the presentation data-generating device of the present invention is not limited to an embodiment in which it is accommodated in a single housing but may be achieved by cooperative operations between a plurality of devices. Due to recent development in network communication technology, it is common that a certain function is performed by cooperative operations between a plurality of devices. Therefore, for example, the web server 10 of the above-mentioned embodiment may be constituted with a plurality of devices.

Also, in the above-mentioned web server 10, an identification information acquisition device having an identification information acquisition part for acquiring identification of the user sending a presentation data generation request may be provided independently, such that it forms a presentation data-generating system together with the web server 10 that is a presentation data-generating device. In this case, presentation data is generated using layout data corresponding to the user sending the presentation data generation request that is acquired in accordance with the identification information acquired by the identification information acquisition device. With such a presentation data-generating system, it is easier to share identification information with other devices as compared to a case in which identification information-acquiring part is provided in a single presentation data-generating device.

A program for causing the CPU 11 of the above-mentioned web server 10 to function as the above-mentioned various means may be prestored in the HDD of the web server 10 or may be provided by being stored in a recording medium such as a CD-ROM or a flexible disk or in a non-volatile recording medium (memory) such as an SRAM, an EEPROM or a memory card. The program stored in the memory is installed in the web server 10 and executed by the CPU 11 or is read out from the memory into the CPU 11 and executed for causing the CPU 11 to function as the above-mentioned various means.

Further, the program may be downloaded from an external apparatus provided with a recording medium in which the program is stored or from an external apparatus in which the program is stored in the recording part and then executed.

Recently, a so-called portal service has become of interest. The portal service enables access to various services such as a search engine, my favorite links, e-mail and HDD management within a single screen (window) of a browser. In order to provide a portal service, contents of web services that are dispersed among various sites should be presented in a single window of the browser. In order to achieve this, a framing function is commonly used.

Framing is one of the web page display techniques in which a window of a browser is divided into several portions, i.e., frames, and different contents are presented in each of the portions. Using a framing technique, different HTML data can be presented in the divided portions of the window.

However, since not all the browsers are equipped with a framing function, there is a problem that such a portal service cannot be used in a browser that does not support framing function. Also, since a frame division operation is a process performed on the browser side, the display area cannot be controlled on the server side. Therefore, in some of the browsers, there arises a problem that there is a misalignment in presenting the graphical user interface (GUI). Further, a process of reflecting some operations in a certain frame into displays in other frames is described in a program code utilizing a language such as JavaScript. Since this is complicated and the process operation depends on functions of the browser, there are problems that the code should be written differently between different browsers and thus a considerable effort is required in designing the code.

On the contrary, in accordance with the presentation data-generating device, the presentation data-generating system and the presentation data-generating method of the present invention, a single unified presentation data for presenting contents of a plurality of document data with a desired layout can be generated. Using such a presentation data, the browser may present a display screen shown in FIG. 18, for example.

FIG. 18 relates to an example in which a single unified presentation data set for presenting a display screen for offering four web services "Broad Search", "Service List", "Bookmarks" and "Document and Folder View" is generated and used for presenting a screen on the browser. Thus, according to the present invention, a screen for offering various services collected from a plurality of web servers (not necessary to be different for each service) in a single window of the browser. Of course, the contents of the document data are not limited to the above-mentioned contents.

Therefore, since a presentation operation can be performed independent of the browser functions of the client, the above-mentioned problems of framing can be avoided. Therefore, designing and control of the services at the web server is facilitated.

Also, when various services are offered by being presented on a browser using such a presentation data, the server can take entire control over the contents to be presented on the browser. Therefore, without installing applications in each of the client terminals, the user can use desired web service using basic browser functions only.

As has been described in the description of the related art, it is difficult to display contents of a plurality of documents on a single HTML data set on a browser by simply transforming the XML format data into an HTML format in accordance with an XSL data.

Further, the present invention is not limited to these embodiments, and variations and modifications may be made without departing from the scope of the present invention.

The present application is based on Japanese priority application No. 2002-098051 filed on Mar. 29, 2002, and on No. 2003-74118 filed on Mar. 18, 2003, the entire contents of which are hereby incorporated by reference.

What is claimed is:

1. A device for generating presentation data comprising:

a document data acquisition part for acquiring a plurality of document data sets, each document data set containing contents to be presented;

a transformation data acquisition part for acquiring a plurality of transformation data sets, each transformation data set defining a rule for transforming respective one of said document data sets into a presentation data set that presents contents of said document data sets;

a layout data acquisition part for acquiring a layout data set containing layout information that defines a layout of said document data sets upon presenting contents of said document data sets, wherein the layout data set contains acquisition source reference information for acquiring said document data set and said transformation data set corresponding to said document data set; and a presentation data-generating part for transforming said document data sets based on said layout data set and on said transformation data sets so as to generate a unified presentation data set that presents contents of said document data sets in accordance with said layout defined in said layout data set.

2. The device as claimed in claim 1, wherein said presentation data-generating part further comprises:

a unified document data-generating part for generating a unified document data set by arranging said document data sets acquired by said document data acquisition part in an appropriate order and adding said layout information contained in said layout data set;

a unified transformation data generating-part for generating a unified transformation data set by arranging said transformation data sets acquired by said transformation data acquisition part in an appropriate order; and a unified presentation data generating-part for generating a unified presentation data set by transforming said unified document data set in accordance with said unified transformation data set and said layout information added to said unified document data set.

3. The device as claimed in claim 1 wherein, said layout data set contains acquisition reference information indicating destinations to refer to upon acquiring said document data sets and said transformation data sets for said document data sets;

said document data acquisition part includes a part for acquiring said document data sets in accordance with said acquisition source reference information; and said transformation data acquisition part includes a part for acquiring necessary transformation data set in accordance with said acquisition source reference information.

4. The device as claimed in claim 1 wherein, said layout information contained in said layout data set indicates a layout of said document data sets in predefined blocks.

5. The device as claimed in claim 4 wherein, said layout data set contains acquisition source reference information for each of said predefined blocks, said acquisition source reference information for acquiring said document data sets at a position of said predefined block, and said transformation data sets for said document data sets;

said document data acquisition part includes a part for acquiring said document data sets in accordance with said acquisition source reference information; and said transformation data acquisition part includes a part for acquiring necessary transformation data sets in accordance with said acquisition source reference information.

6. The device as claimed in claim 1 wherein, said transformation data acquisition part includes a part for acquiring element reference information indicating elements constituting said transformation data and a part for acquiring said elements in accordance with said element reference information and a part for acquiring necessary transformation by combining said elements, and each of said elements indicates data defining a rule for transforming a part of said document data into presentation data that presents contents of said document data.

7. The device as claimed in claim 1 further comprising:

a representation request receiving part for receiving a display data-generation request; and an identification information acquisition part for acquiring identification of a user sending said generation request, wherein said layout data acquisition part acquires a layout data set corresponding to said user in accordance with said identification information.

8. The device as claimed in claim 1 further comprising:

a representation request receiving part for receiving a display data-generation request; and an identification information acquisition part for acquiring identification of a client sending said generation request, wherein said layout data acquisition part acquires a layout data set corresponding to said client in accordance with said identification information.

9. The device as claimed in claim 1 further comprising:

a device type acquisition part for acquiring device type information of a device on which said presentation data set is to be presented, wherein said layout data acquisition part acquires said layout data set indicating a layout suitable for presentation on a type of device indicated by said device type information.

10. The device as claimed in claim 1, wherein said document data is in an extensible markup language (XML) format;

said transformation data is in an extensible style sheet language (XSL) format; and said presentation data is in a hypertext markup language (HTML) format.

11. The device as claimed in claim 10, wherein said transformation data is in an extensible style sheet language (XSL) format.

12. A system for generating presentation data comprising a presentation data generating-device and a data management device connected to said presentation data generating-device via a network, wherein, said presentation data generating-device includes:

a document data acquisition part for acquiring a plurality of document data sets, each document data set containing contents to be presented;

a transformation data acquisition part for acquiring a plurality of transformation data sets, each transformation data set defining a rule for transforming respective one of said document data sets into a presentation data set that presents contents of said document data sets;

a layout data acquisition part for acquiring a layout data set containing layout information that defines a layout of said document data set upon presenting contents of said document data set, wherein the layout data set contains acquisition source reference information for acquiring said document data set and said transformation data set corresponding to said document data set; and a presentation data-generating part for transforming said document data sets based on said layout data set and on said transformation data sets so as to generate a unified presentation data set that presents contents of said document data sets in accordance with said layout defined in said layout data set, wherein said data management device includes:

a data storage part for storing said document data sets and said transformation data sets corresponding to said document data sets, in said presentation data generating-device, said document data acquisition part includes a part for acquiring said document data sets from said data management device, and said transformation data acquisition part includes a part for acquiring said transformation data sets from said data management device.

13. The system as claimed in claim 12, wherein said data management device includes a document data-processing part for processing said document data sets stored in said data storage part in accordance with acquisition requests of said document data sets from said document data acquisition part of said display data presentation device.

14. The system as claimed in claim 12, wherein said document data acquisition part and/or said transformation data acquisition part acquires said document data sets or said transformation data sets via communications using SOAP (Simple Object Access Protocol).

15. A system for generating presentation data comprising a presentation data generating-device and an identification information-acquiring device connected to said presentation data generating-device, wherein said presentation data generating-device includes:

a document data acquisition part for acquiring a plurality of document data sets, each document data set containing contents to be presented;

a transformation data acquisition part for acquiring a plurality of transformation data sets, each transformation data set defining a rule for transforming respective one of said document data sets into a presentation data set that presents contents of said document data sets;

a layout data acquisition part for acquiring a layout data set containing layout information that defines a layout of said document data sets upon presenting contents of said document data sets, wherein the layout data set contains acquisition source reference information for acquiring said document data set and said transformation data set corresponding to said document data set; and a presentation data-generating part for transforming said document data sets based on said layout data set and on said transformation data sets so as to generate a unified presentation data set that presents contents of said document data sets in accordance with said layout defined in said layout data set, said identification information acquiring-device including an identification information-acquiring part for acquiring identification of a user sending a generation request of a presentation data set to said presentation data-generating device, said layout data acquisition part of said presentation data generating-device acquiring a layout data set for said user in accordance with said identification data.

16. A system for generating presentation data comprising a presentation data generating-device and an identification information-acquiring device connected to said presentation data generating-device, wherein said presentation data generating-device includes:

a document data acquisition part for acquiring a plurality of document data sets, each document data set containing contents to be presented;

a transformation data acquisition part for acquiring a plurality of transformation data sets, each transformation data set defining a rule for transforming respective one of said document data sets into a presentation data set that presents contents of said document data sets;

a layout data acquisition part for acquiring a layout data set containing layout information that defines a layout of said document data sets upon presenting contents of said document data sets, wherein the layout data set contains acquisition source reference information for acquiring said document data set and said transformation data set corresponding to said document data set; and a presentation data-generating part for transforming said document data sets based on said layout data set and on said transformation data sets so as to generate a unified presentation data set that presents contents of said document data sets in accordance with said layout defined in said layout data set, said identification information acquiring-device including an identification information-acquiring part for acquiring identification of a client sending a generation request of a presentation data set to said presentation data-generating device, said layout data acquisition part of said presentation data generating-device acquiring a layout data set for said client in accordance with said identification data.

17. A system for generating presentation data comprising a presentation data generating-device and an identification information-acquiring device connected to said presentation data generating-device, wherein said presentation data generating-device includes:

a document data acquisition part for acquiring a plurality of document data sets, each document data set containing contents to be presented;

a transformation data acquisition part for acquiring a plurality of transformation data sets, each transformation data set defining a rule for transforming respective one of said document data sets into a presentation data set that presents contents of said document data sets;

a layout data acquisition part for acquiring a layout data set containing layout information that defines a layout of said document data sets upon presenting contents of said document data sets, wherein the layout data set contains acquisition source reference information for acquiring said document data set and said transformation data set corresponding to said document data set; and a presentation data-generating part for transforming said document data sets based on said layout data set and on said transformation data sets so as to generate a unified presentation data set that presents contents of said document data sets in accordance with said layout defined in said layout data set, said identification information acquiring-device including a device type acquisition part for acquiring device type information of a device on which said presentation data set is to be presented, said layout data acquisition part acquiring said layout data set indicating a layout suitable for presentation on a type of device indicated by said device type information.

18. A data management device connected to a presentation data generating-device via a network, said presentation data generating-device including:

a document data acquisition part for acquiring a plurality of document data sets, each document data set containing contents to be presented;

a transformation data acquisition part for acquiring a plurality of transformation data sets, each transformation data set defining a rule for transforming respective one of said document data sets into a presentation data set that presents contents of said document data sets;

a layout data acquisition part for acquiring a layout data containing layout information that defines a layout of said document data sets upon presenting contents of said document data sets, wherein the layout data set contains acquisition source reference information for acquiring said document data set and said transformation data set corresponding to said document data set; and a presentation data-generating part for transforming said document data sets based on said layout data set and on said transformation data sets so as to generate a unified presentation data set that presents contents of said document data sets in accordance with said layout defined in said layout data set, said data management device comprising:

a data storage part for storing said document data sets; and a data transmission part for acquiring said document data sets from said storage part in accordance with said request from said presentation data generating-data and transmitting said document data sets to said presentation data storage device.

19. The data management device as claimed in claim 18, wherein said request from said presentation data generating-device is transmitted using SOAP (Simple Object Access Protocol).

20. A method to be implemented on a computer for generating presentation data comprising the steps of:

a) acquiring a layout data set containing layout information that defines a layout of document data sets upon presenting contents of said document data sets;

b) acquiring a plurality of document data sets, each document data set containing contents to be presented;

c) acquiring a plurality of transformation data sets, each transformation data set defining a rule for transforming respective one of said document data sets into a presentation data set that presents contents of said document data sets, wherein the layout data set contains acquisition source reference information for acquiring said document data set and said transformation data set corresponding to said document data set; and d) transforming said document data sets based on said layout data set and on said transformation data sets so as to generate a unified presentation data set that presents contents of said document data sets in accordance with said layout defined in said layout data set.

21. The method as claimed in claim 20, wherein said presentation data-generating step further comprises the steps of:

e) generating a unified document data set by arranging said document data sets acquired by said document data acquisition part in an appropriate order and adding said layout information contained in said layout data set;

f) generating a unified transformation data set by arranging said transformation data sets acquired by said transformation data-acquiring part in an appropriate order; and g) generating a unified presentation data by transforming said unified document data set in accordance with said unified transformation data set and said layout information added to said unified document data set.

22. The method as claimed in claim 20 wherein, said layout data set contains acquisition source reference information for each of said predefined blocks, said acquisition source reference information for acquiring said document data sets at a position of said predefined block, and said transformation data sets for said document data sets;

said step b) includes a step of acquiring said document data sets in accordance with said acquisition source reference information; and said step c) includes a step of acquiring necessary transformation data in accordance with said acquisition source reference information.

23. The method as claimed in claim 20 wherein, said step c) includes a step of acquiring element reference information indicating elements constituting said transformation data, a step of acquiring said elements in accordance with said element reference information and a step of acquiring necessary transformation by combining said elements, and each of said elements indicates data defining a rule for transforming a part of said document data into a presentation data set that presents contents of said document data sets.

24. The method as claimed in claim 20 further comprising the steps of:

h) receiving a display data-generation request; and i) acquiring identification of a user sending said generation request, wherein, in said step a), a layout data set corresponding to said user is acquired in accordance with said identification information.

25. The method as claimed in claim 20 further comprising the steps of:

h) receiving a display data-generation request; and j) acquiring identification of a client sending said generation request, wherein, in said step a), a layout data set corresponding to said client is acquired in accordance with said identification information.

26. A machine-readable storage medium storing program code for causing a computer to generate presentation data, comprising:

first program code means for acquiring a plurality of document data sets, each document data set containing contents to be presented;

second program code means for acquiring a plurality of transformation data sets, each transformation data set defining a rule for transforming respective one of said document data sets into a presentation data set that presents contents of said document data sets;

third program code means for acquiring a layout data set containing layout information that defines a layout of said document data sets upon presenting contents of said document data sets, wherein the layout data set contains acquisition source reference information for acquiring said document data set and said transformation data set corresponding to said document data set; and fourth program code means for transforming said document data sets based on said layout data set and on said transformation data sets so as to generate a unified presentation data set that presents contents of said document data sets in accordance with said layout defined in said layout data set.

27. The machine-readable storage medium as claimed in claim 26, wherein said fourth program code means further comprises:

fifth program code means for generating a unified document data set by arranging said document data sets acquired by said document data acquisition part in an appropriate order and adding said layout information contained in said layout data set;

sixth program code means for generating a unified transformation data set by arranging said transformation data sets acquired by said transformation data-acquiring part in an appropriate order; and seventh program code means for generating a unified presentation data set by transforming said unified document data set in accordance with said unified transformation data set and said layout information added to said unified document data set.

28. The machine-readable storage medium as claimed in claim 26, wherein, said layout data set contains acquisition source reference information for each of said predefined blocks, said acquisition source reference information for acquiring said document data sets at a position of predefined block, and said transformation data sets for said document data sets;

said first program code means includes program code means for acquiring said document data sets in accordance with said acquisition source reference information; and said second program code means includes program code means for acquiring necessary transformation data in accordance with said acquisition source reference information.

29. The machine-readable storage medium as claimed in claim 26, wherein, said second program code means includes program code means for acquiring element reference information indicating elements constituting said transformation data and program code means for acquiring said elements in accordance with said element reference information and a part for acquiring necessary transformation by combining said elements, and each of said elements indicates data defining a rule for transforming a part of said document data into a presentation data set that presents contents of said document data.

30. The machine-readable storage medium as claimed in claim 26, further comprising:

eighth program code means for receiving a display data-generation request; and ninth program code means for acquiring identification of a user sending said generation request, wherein said third program code means acquires a layout data set corresponding to said user in accordance with said identification information.

31. The machine-readable storage medium as claimed in claim 26, further comprising:

tenth program code means for acquiring device type information of a device on which said presentation data is to be presented, wherein said third program code means acquires a layout data set indicating a layout suitable for presentation on a type of device indicated by said device type information.

* * * * *